United States Patent [19]

Adolfsson

[11] Patent Number: 6,092,078
[45] Date of Patent: Jul. 18, 2000

[54] METHOD AND APPARATUS FOR INTERFACING NETWORK PERIPHERAL DEVICES WITH A BROWSER

[75] Inventor: Johan Gunnar Fredrik Adolfsson, Lund, Sweden

[73] Assignee: Axis Communications AB, Lund, Sweden

[21] Appl. No.: 09/368,406

[22] Filed: Aug. 4, 1999

Related U.S. Application Data

[63] Continuation-in-part of application No. 09/066,071, Apr. 24, 1998.

[51] Int. Cl.[7] .................................................. G06F 17/30
[52] U.S. Cl. .......................... 707/102; 707/103; 707/104; 364/132
[58] Field of Search .................................. 707/102, 103, 707/104; 364/132, 140, 222; 395/200; 340/527; 345/329, 336

[56] References Cited

U.S. PATENT DOCUMENTS

| | | | |
|---|---|---|---|
| 5,095,444 | 3/1992 | Motles | 395/200 |
| 5,491,801 | 2/1996 | Jain et al. | 395/200 |
| 5,742,845 | 4/1998 | Wagner | 395/831 |
| 5,822,535 | 10/1998 | Takase et al. | 395/200 |
| 5,831,848 | 11/1998 | Rielly et al. | 364/132 |

OTHER PUBLICATIONS

Coactive Networks, Inc., "Web Access to Lon Works I/O", Internet Advertisement, 4 pages (1998).
WHI Konsult AB, "Net Controller", Internet Advertisement for Ethernet TCP/IP controller, 4 pages, Aug. 1997.

*Primary Examiner*—Wayne Amsbury
*Assistant Examiner*—Thu Thao Havan
*Attorney, Agent, or Firm*—Wilson Sonsin Goodrich & Rosati

[57] ABSTRACT

The current invention provides method and apparatus for communications between network attached peripheral devices and one or more server nodes for the collection of data from the peripheral devices. In an alternate embodiment of the invention a method and apparatus for monitoring peripheral devices on a network is disclosed. In an alternate embodiment of the invention a method and apparatus for remotely configuring network peripheral devices is disclosed. In an alternate embodiment of the invention a method for enabling a web browser to provide a graphical user interface (GUI) for monitoring peripheral devices on the internet is disclosed.

40 Claims, 20 Drawing Sheets

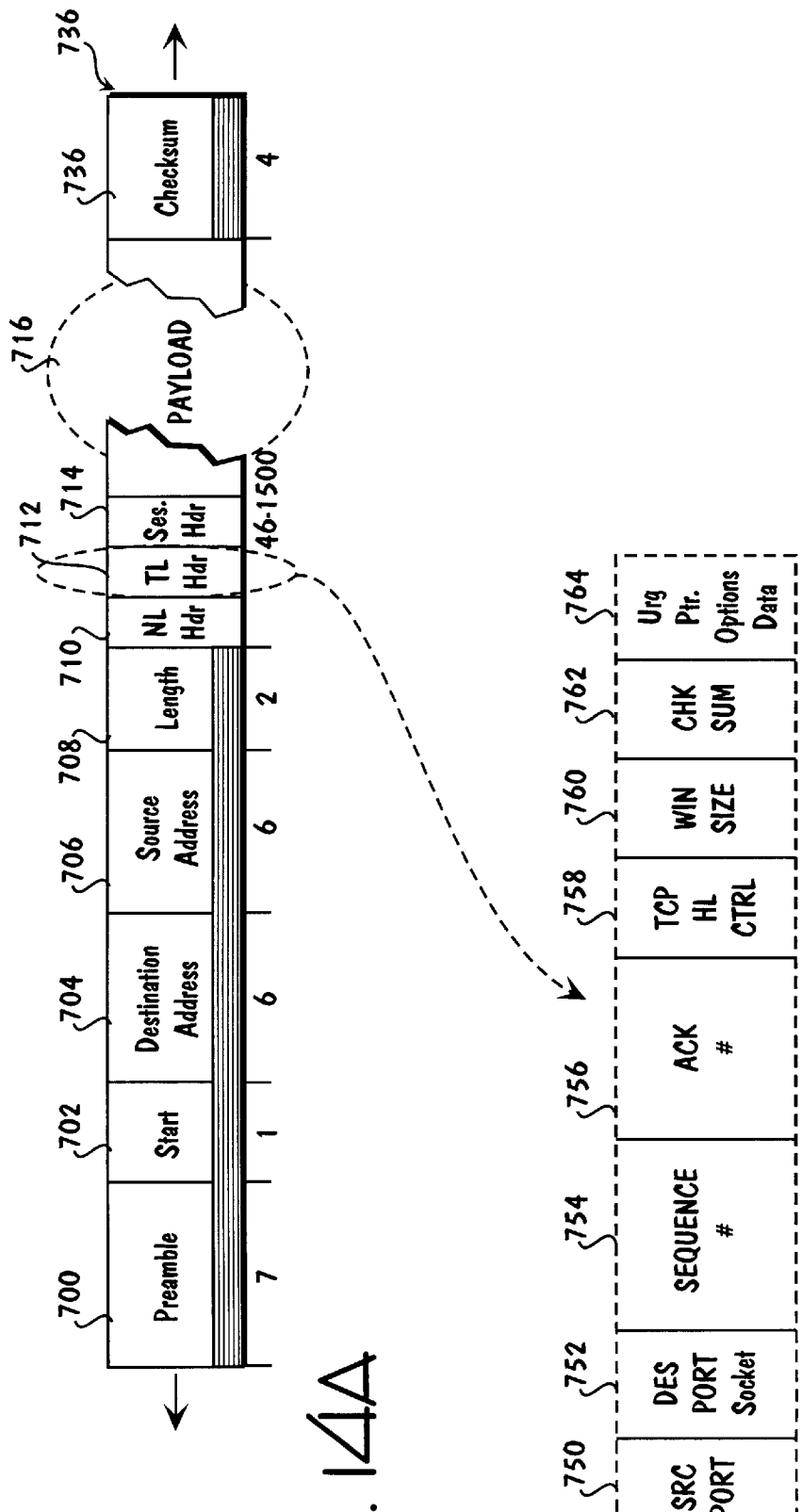

6,092,078

METHOD AND APPARATUS FOR INTERFACING NETWORK PERIPHERAL DEVICES WITH A BROWSER

Cross Reference to Related Applications

This application is a Continuation-in-Part of U.S. patent application Ser. No. 09/066,071, filed Apr. 24, 1998, entitled "Method and Apparatus for Interfacing Network Peripheral Devices with a Browser".

FIELD OF THE INVENTION

The present invention relates to data communications, and more particularly to techniques for operating peripheral data gathering devices on a network.

BACKGROUND

A tremendous growth in the use of the Internet is projected. Much of the projected growth is expected to be in machines communicating across the internet. Manufacturers will monitor products in customers homes and business to determine the best times to service, repair or replace. Home owners will be able to monitor appliances, furnace, air conditioning, and security in their homes from around the world.

The increase in traffic however will slow an already over-burdened infrastructure of the internet. What is needed are ways to enhance the quality of communications on the internet without a corresponding demand for more bandwidth.

The growth of the use of the Internet has also resulted in a desire to make it easy to get access to dynamic information sources or monitoring/controlling different equipment, such as networked cameras, transducers, automated equipment etc. Most of the present systems require specialized programs and communications for making such information The need for specialized programs results in rather expensive solutions.

Another problem, when trying to make such information available to as many as possible, are the security arrangements, like firewalls, surrounding almost every company network today.

SUMMARY

An object of the present invention is to provide a method and an apparatus for collecting and distributing data over a network that is requires less data traffic and bandwidth.

According to one aspect of the present invention, a hypertext transfer protocol (HTTP) is used to stop the reception of data from various, different data providing means, such as different pieces of measuring equipment.

According to another aspect of the present invention, easy access to various, different data providing means for the purpose of monitoring or controlling, is enabled without the need for expensive or complicated software programs. For example, in one embodiment, a user may access equipment via an ordinary web-browser.

According to yet another aspect of the invention, specific communication modules for specific equipment are stored within a network enabling input/output device, hereinafter called NEIOD. This makes it unnecessary to keep track of software upgrades. This also results in the advantage of simplified updating for a system administrator.

In one embodiment of the invention, an open data channel for distribution of data over a network is set up, wherein a data length of a transmission is not defined. Thus the connection is kept open in a new and simple manner and updated data can be transmitted without waiting for a request for new or updated data.

BRIEF DESCRIPTION OF THE DRAWINGS

Other features and advantages of the present invention will become apparent in the following detailed description of the preferred embodiment, with reference to the accompanying drawings in which:

FIGS. 14A–B and FIG. 15 show details of the data structure for transmitting data over a local area network (LAN) and a wide area network (WAN).

DETAILED DESCRIPTION

Figure 1:
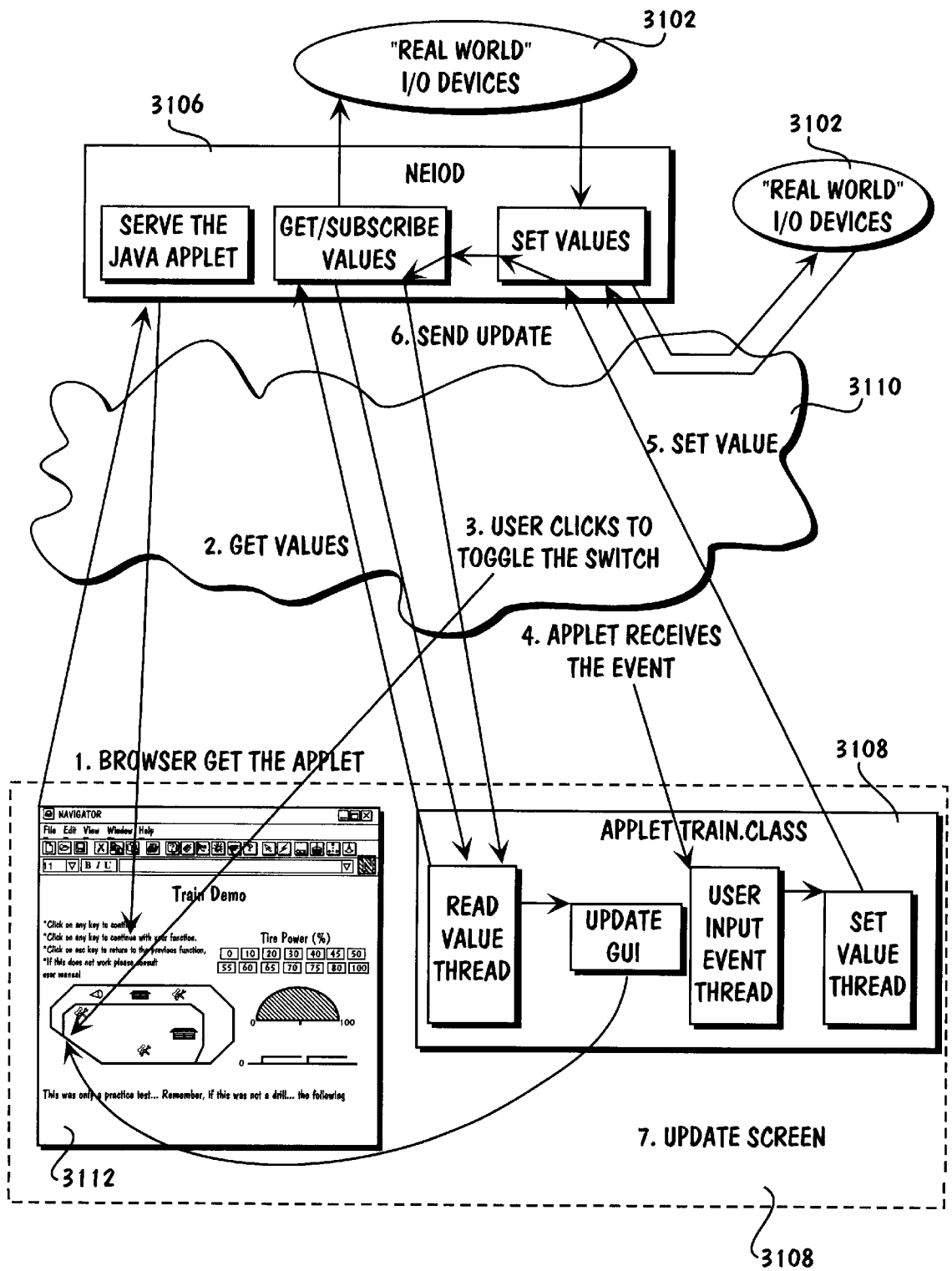
FIG. 1 is a schematic diagram of a NEIOD connected to data providing means and communicating with a data receiving node over a network, and messages sent between the NEIOD and the data providing node.
Figure 2:
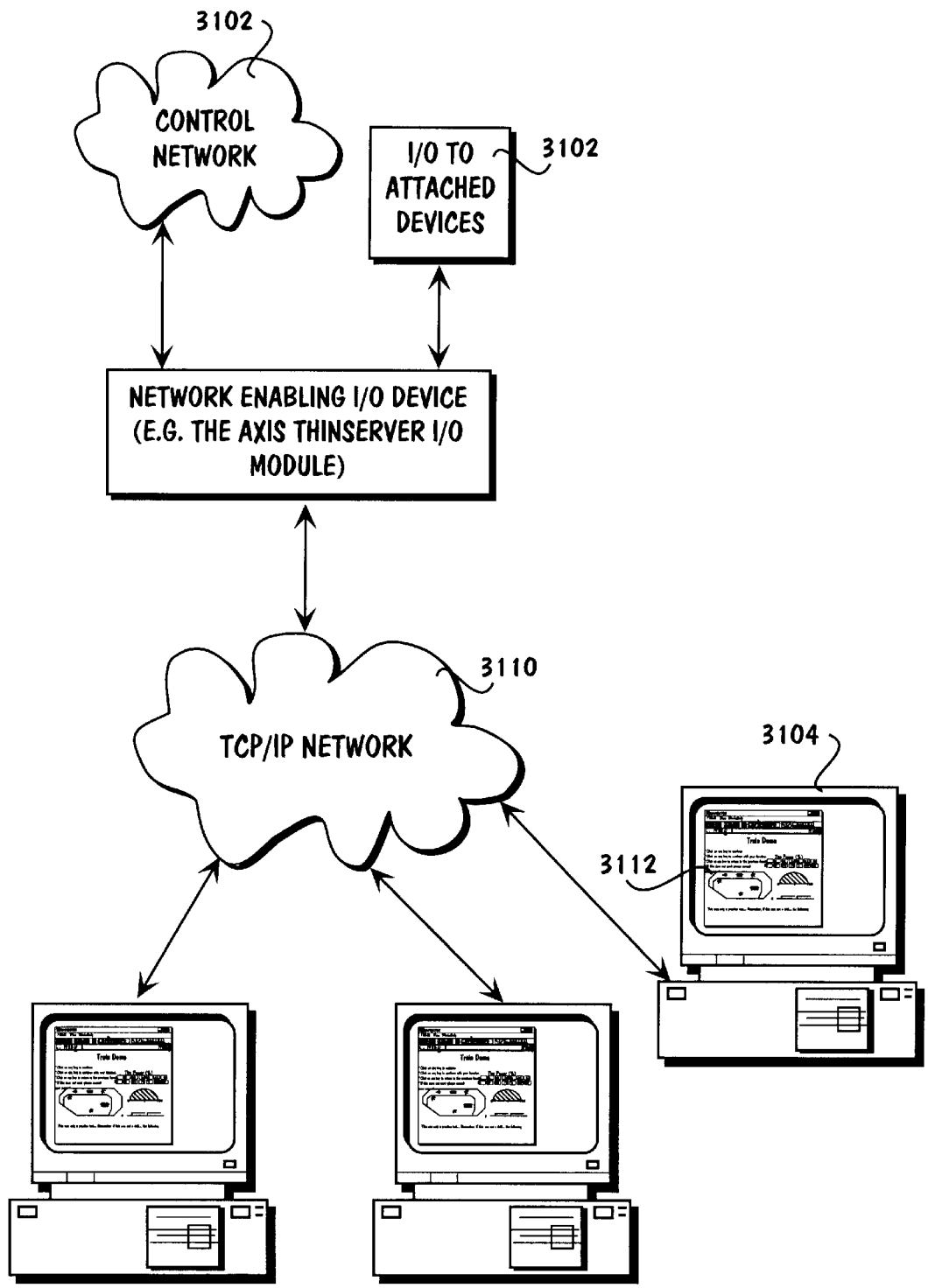
FIG. 2 is a schematic view of a system according to FIG. 1.

Referring now to FIG. 1 and FIG. 2, there is described a preferred embodiment of a system for collecting data from one or more data providing means 3102 and providing the data to a node 3104 in a network 3110. In the case that such a data providing means 3102 is controllable it can be controlled from the node 3104 or another node on the network 3110. All communication between the node 3104 and the data providing means 3102 is performed via a network enabling input output device (NEIOD) 3106.

The data providing means 3102 can be, for example, a camera, a measuring transducer, a card reader, a control network, equipment for automation, a radiator etc. Some of said data providing means 3102 can be controllable. The data providing means 3102 can be connected to the NEIOD directly, via a control unit, via a control network or a computer network.

In one embodiment, the NEIOD 3106 is a network server having the capability of receiving data from and transmitting data to such a data providing means 3102. The NEIOD 3106 is arranged to provide the node 3104 with a communication module 3108, which is adapted for handling data regarding a specific data providing means 3102. In a preferred embodiment of the invention the communication module 3108 is an application or a Java applet. Further, the NEIOD is arranged to communicate with said communication module 3108, when the module 3108 is active at the node 3104. The NEIOD can be connected to a plurality of communication modules, arranged at one node or at a plurality of different nodes of the network 3110.

In a preferred embodiment of the invention the network includes a plurality of nodes. The preferred network is a network based on transmission control protocol over internet protocol (TCP/IP), for example the Internet, an intranet and other types of networks based on TCP/IP.

In a preferred emodiment the node 3104 is a computer for processing data transmitted by the NEIOD. Similar computers, in respect of function, are possibly arranged as other nodes. In a preferred embodiment of the invention the computer presents data regarding at least one specific data providing means 3102 on a screen within a page 3112 presented by a web-browser running on the computer. If a data providing means 3102 presented on the page 3112 is controllable, control means can be presented within the page. The control means can be arranged for adjustment by clicking, dragging or typing control parameters.

The communication module 3108 is a module, that is arranged in the computer at the node 3104 when in use. The module 3108 handles the communication with the NEIOD 3106 and is also responsible for the presentation of the data and the control means on the page. The module is specially adapted to the specific type of data providing means 3102 that it is to represent and possibly control. The communication module 3108 can be downloaded from a NEIOD to a node.

When setting up a channel for exchanging data between the NEIOD 3106 and the communication module 3108, it has to be decided whether the data exchange is to be performed once for updating the data present at the node 3104 (first alternative) or whether the data present at the node 3104 is to be updated whenever there is new data available, herein called subscription (second alternative). The communication is, in a preferred embodiment of the invention, performed according to the hypertext transfer protocol (HTTP).

The first alternative above is performed as a conventional poll. The poll is started by the communication module 3108 being ordered by the user, via a web page 3112, to get a specific data from the NEIOD 3106.

Then the communication module 3108 is connecting to the NEIOD 3106. Thereafter the communication module 3108 requests the specific data, whereupon the NEIOD 3106 transmits the data to the communication module, which provides the presentation page 3112 with the requested data. When the transmission has been performed the connection is terminated.

When connecting and terminating the connection, data regarding addresses, handshaking signals and other communication parameters are exchanged. Thus, when the alternative of subscribing is present, the polling method requires the NEIOD 3106 and the communication module 3108 to connect and disconnect every time data is updated. If the requested data of a data providing means 3102 is frequently updated and the amount of the requested data is small in relation to the data required for connecting and disconnecting, however, the network 3110 may transport a lot of redundant data.

By performing the subscription alternative as an open data channel redundancy is reduced. When the communication module 3108 is requesting the data from the specific data providing means 3104 the first time, a request of subscription is sent to the NEIOD 3106. Then the NEIOD keeps the connection open, i.e. it is not terminated, and sends updated data as soon as updated data is available or at another rate if requested. The open connection, when using the HTTP-protocol, is achieved by not defining any length of the contents in the response from the NEIOD 3106 to the communication module 3108.

Assume that a user wants to monitor and control a model railway, according to a preferred embodiment of the invention. He connects to a web page, which is provided for monitoring the railway and for the control thereof. The web page is presented in a browser. The browser gets information from the web page regarding what communication module (s) 3108 it is to download and where to find the module(s) 3108. The communication module 3108 is stored in a NEIOD 3106 that is coupled to the model railway and is, in this case, a Java applet 3108. The browser transmits an initiation message to get the applet 3108. The initiation message is an HTTP GET command that instructs the NEIOD to send the preparation message to the browser. The preparation message includes the requested applet 3108. Thereafter the applet 3108 is executed in the browser and is provided with information from the web page 3112 regarding initial parameters. The initial parameters tell the applet 3108 to connect to the NEIOD 3106 and to receive the data monitored/controlled by the specific applet 3108. The applet 3108 sends an HTTP GET request, comprising requests of the desired data and an indication regarding whether the data are to be subscribed to or not, to the NEIOD 3106.

Let us assume that the request indicates a subscription to the data. Then the NEIOD 3106 responds to the request by sending the requested data and keeping the connection open in response to the indicated subscription. The subscription connection is kept open by not setting the "Content-Length" in the response. The "Content-Length" is defining the length of an HTTP message and is normally defined when using HTTP. Thus, the connection will occupy one socket at the NEIOD 3106 and one socket at the node 3104 until the subscription connection is terminated. The subscription connection is terminated when either the communication module 3108 is terminated, e.g. by the user, or an optional configural timeout has expired. The connection can be terminated by either the NEIOD 3106 or the communication module 3108. The requested data are received by the applet 3108 and the applet 3108 makes changes in the presentation of the data, on the web page 3112, according to the new data.

Further, let us assume that the model railway is controllable and that the user wants to change, for example, a switch in the model railway. Then the user could click on a switch presented on the web page 3112. The applet 3108 then receives the click event and connects to the NEIOD 3106 via a socket not occupied by, for example, subscriptions. The applet 3108 makes an HTTP GET request to change the switch. The NEIOD 3106 receives the request and translates it to an I/O operation to be sent to the model railway for making the physical change. Because the request was used to set a value, the NEIOD 3106 will send a response to the applet 3108 by a connection other than the subscription connection. If other nodes are running the same applet 3108 or another applet monitoring the switch and having a subscription connection, then the NEIOD will send the new data regarding the switch to these applets over their subscription connection.

Figure 3:
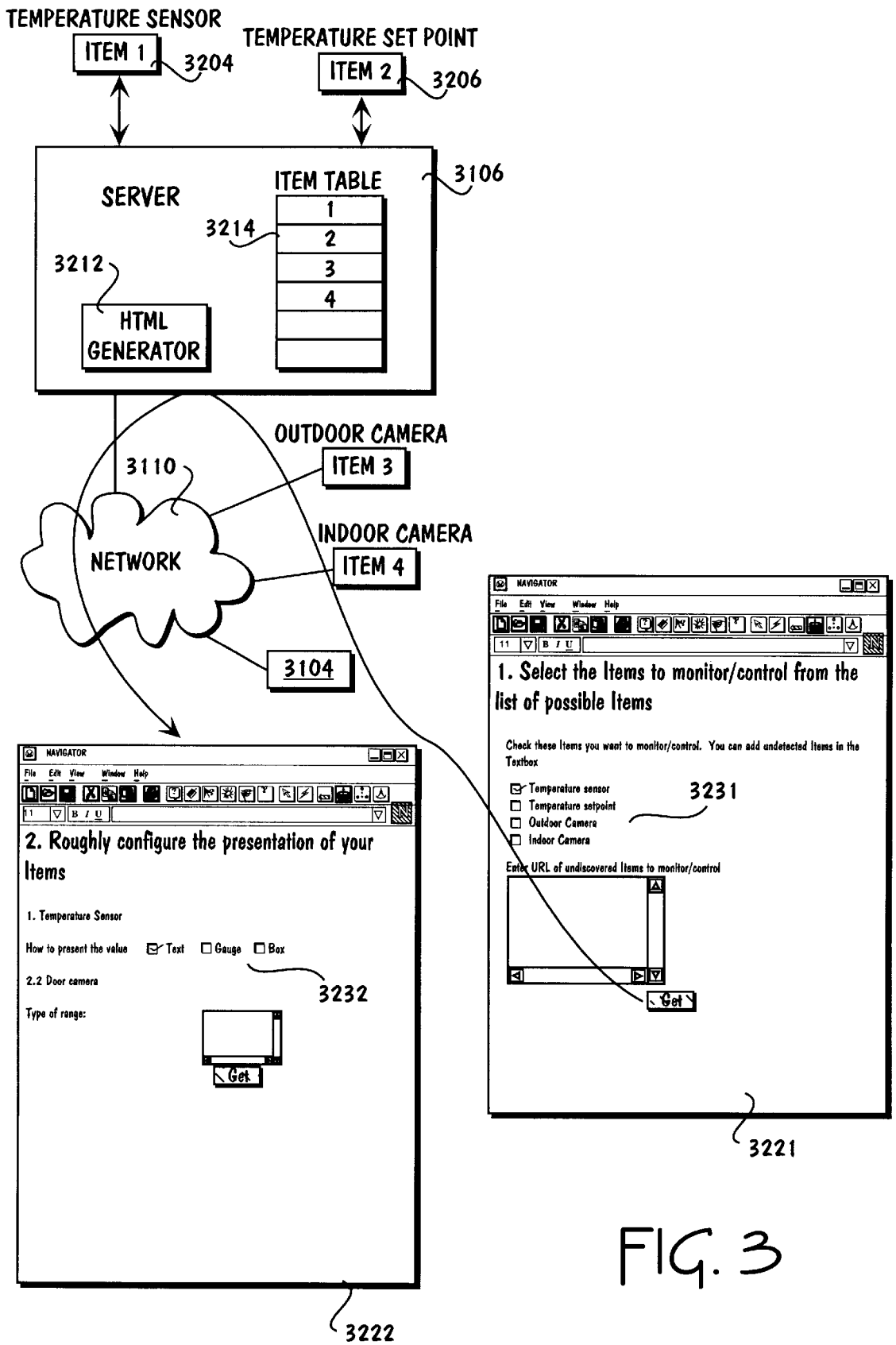
FIGS. 3–4 are schematic diagrams of constructing a web page for monitoring/controlling data providing means.
Figure 4:
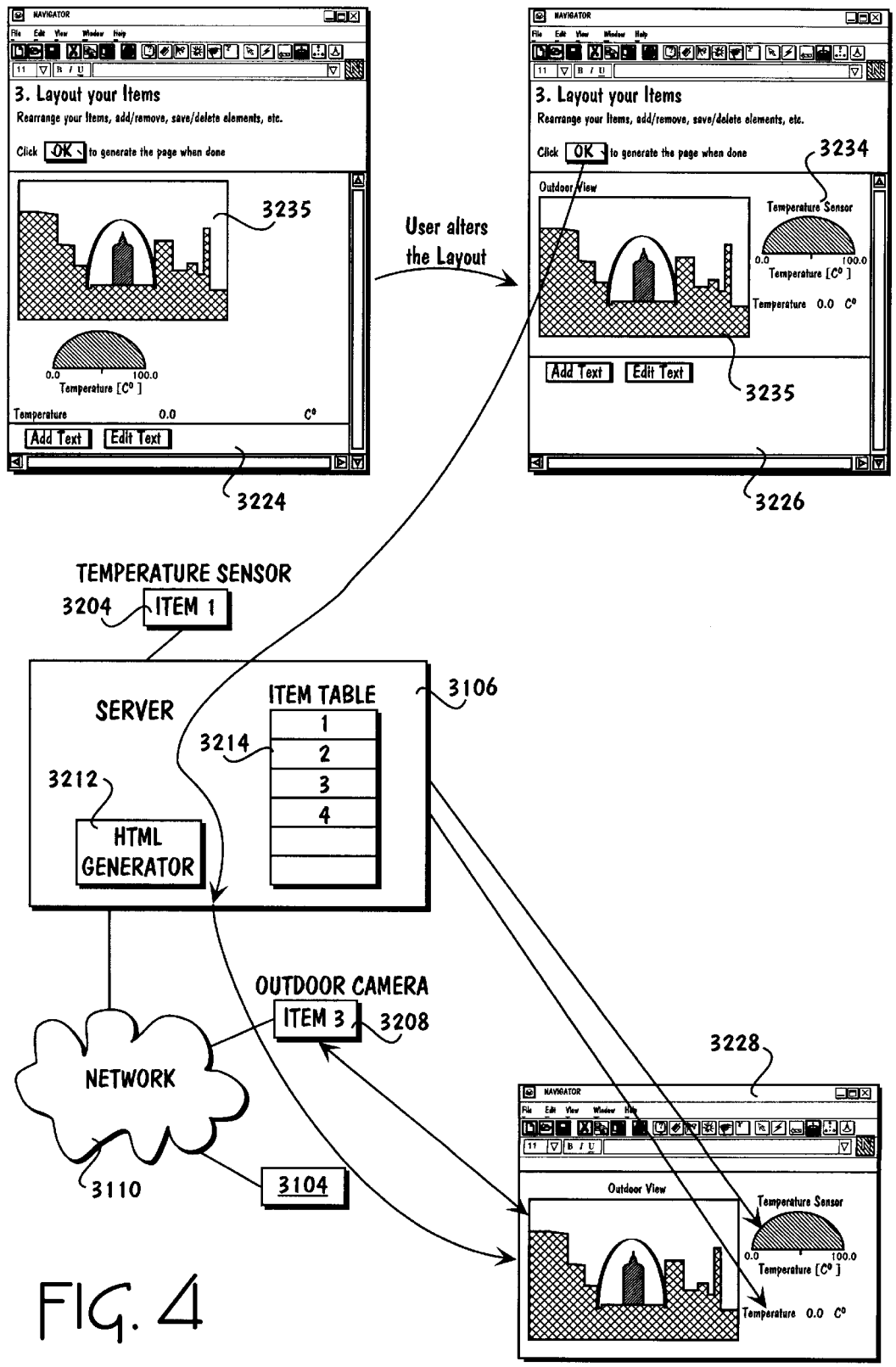
Figure 5:
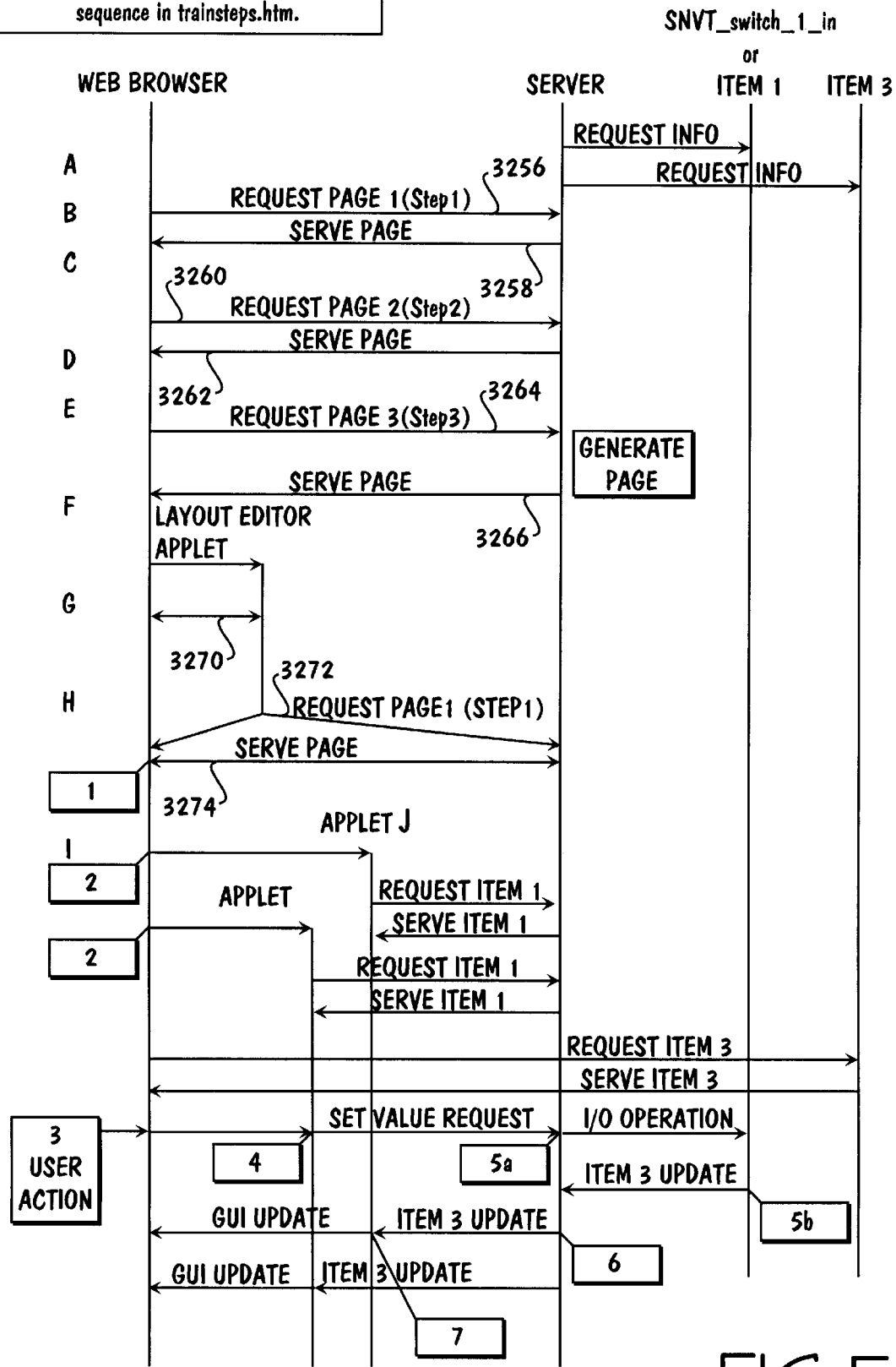
FIG. 5 is a diagram of messages sent when constructing a web page according to FIGS. 3–4.

Now referring to FIGS. 3, 4 and 5, there is described a method of creating unique web pages for monitoring/controlling data providing means 3204–3210 that is connected to a NEIOD 3106 from the node 3104 connected to the network 3110.

The NEIOD 3106 is arranged to store a table 3214 including information regarding the data providing means 3204–3210 that it is handling. The table 3214 can be created by the NEIOD itself, which then is searching for data providing means 3204–3210 that have a connection to it, or it can be typed. A combination of these is also possible. Further, the NEIOD 3106 comprises an HTML-generator 3212 for generating web pages.

When the node 3104 requests, step 3256, a "select" web page from the NEIOD 3106, the NEIOD 3106 generates the select web page 3221 and sends, step 3258, it to the requesting node. The select web page 3221 provides selection means 3231 for selecting one or a plurality of data providing means 3204–3210. In the preferred embodiment the select web page 3221 also provides an input field for typing addresses to data providing means that the NEIOD 3106 has no knowledge about. After the selection of one or more data providing means 3204–3210 has been made, the user clicks a button and a message regarding which data providing means that has been selected is sent, step 3260, from the requesting node 3104 to the NEIOD 3106.

Then the HTML-generator generates a "configuration" web page 3222 and sends, step 3262, it to the requesting node. The configuration web page 3222 provides a new set of selection means 3232 for specifying one or more parameters regarding the presentation of the data providing means 3204–3210 in the final monitoring/controlling web page 3228 (3112 in FIG. 1). The parameters; specified can be, for example, the size of an image from a web-camera, if the image is to be presented live or not, if a measured value is to be presented in digital form, as numbers, or in analogue form, as a bar or as a needle, if a control means is to be presented as an arrow, a slider or a wheel, etc. When one or more parameters are specified, the user clicks a button and the specified parameters are sent, step 3264, to the NEIOD 3106.

The NEIOD 3106 receives the parameters and sends, step 3266, an editing web page 3224–3226 and an editing Java applet, which is to present a layout of one or more monitoring/controlling means 3234–3235 on the editing web page, to the requesting node. The editing Java applet makes it possible for a user to alter, step 3270, the layout of the presentation. The layout can be altered, for example, by selecting a specific presentation of data and moving it by means of a mouse. When the user is satisfied he clicks on a button and information regarding the layout is sent, step 3272, to the NEIOD 3106.

The NEIOD 3106, receives the layout information and generates the final monitoring/controlling web page 3228. The monitoring/controlling web page 3228 is then sent, step 3274, to the requesting node, as disclosed in FIG. 1.

The current invention provides method and apparatus for communications between network attached peripheral devices and one or more server nodes for the collection of data from the peripheral devices. In an alternate embodiment of the invention a method and apparatus for monitoring peripheral devices on a network is disclosed. In an alternate embodiment of the invention a method and apparatus for remotely configuring network peripheral devices is disclosed. In an alternate embodiment of the invention a method for enabling a web browser to provide a graphical user interface (GUI) for monitoring peripheral devices on the internet is disclosed.

Figure 6:
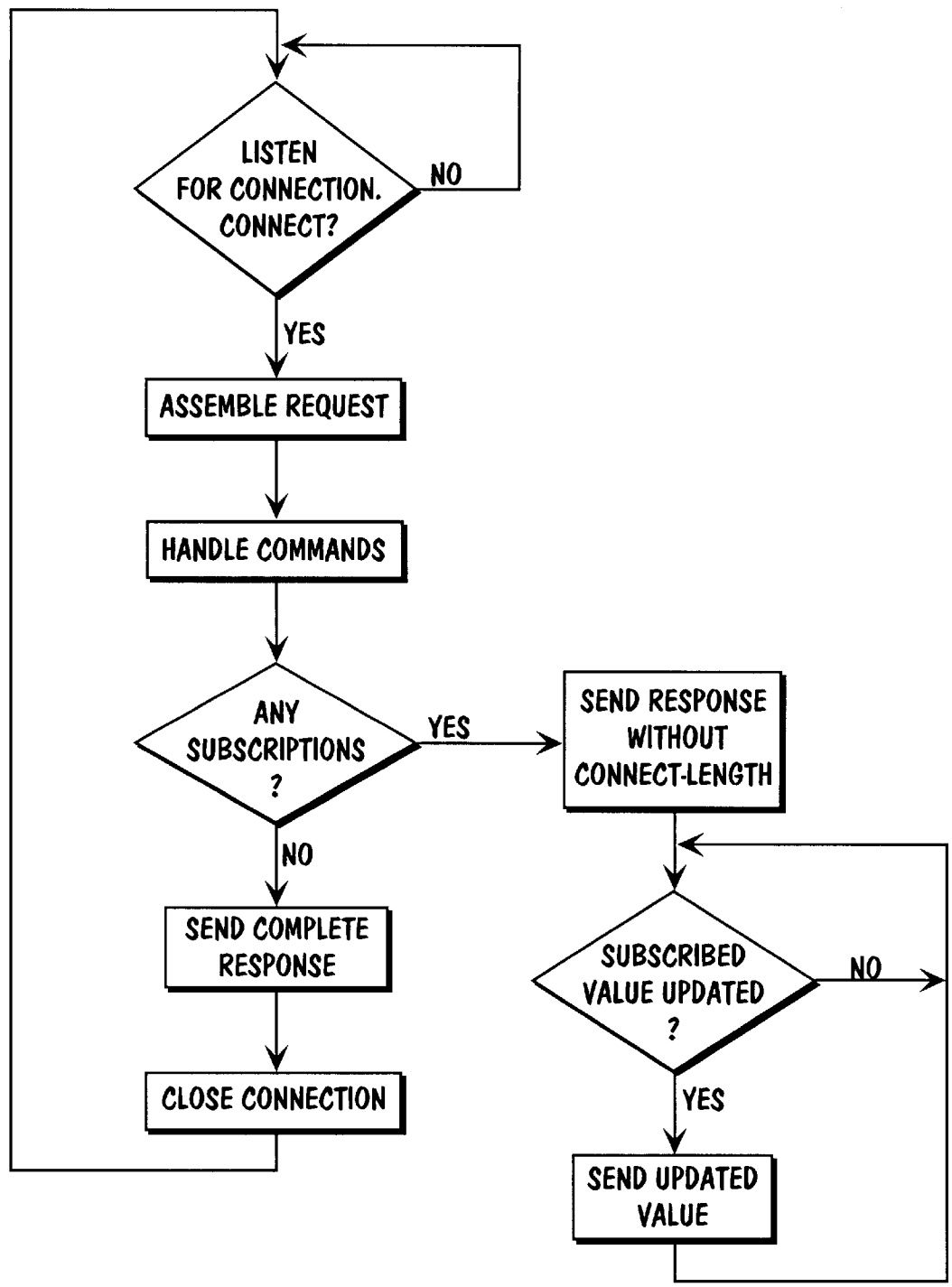
FIGS. 6–8 are flowcharts over the operation of the NEIOD regarding monitoring and controlling data providing devices from a node in a network.
Figure 7:
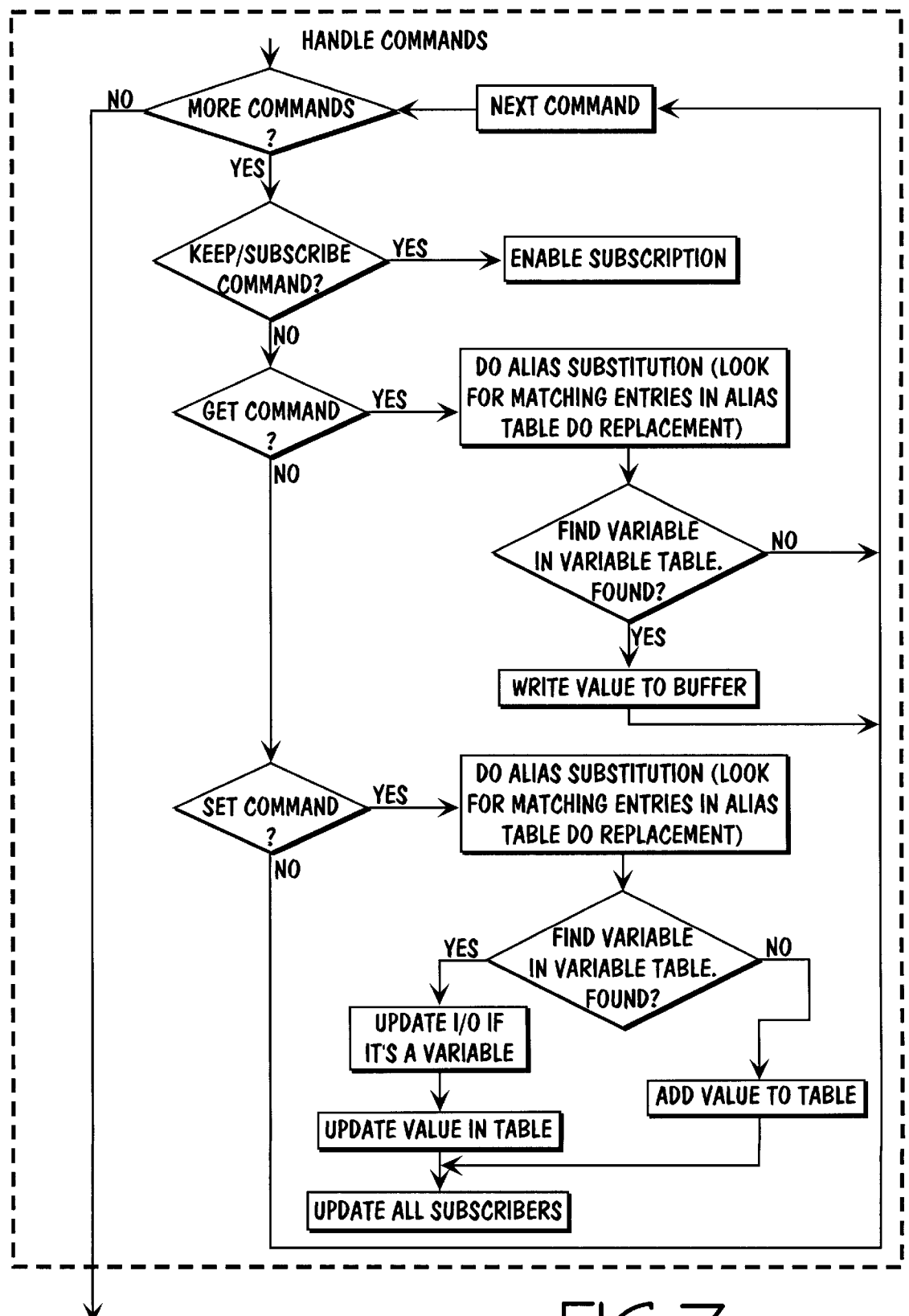
Figure 8:
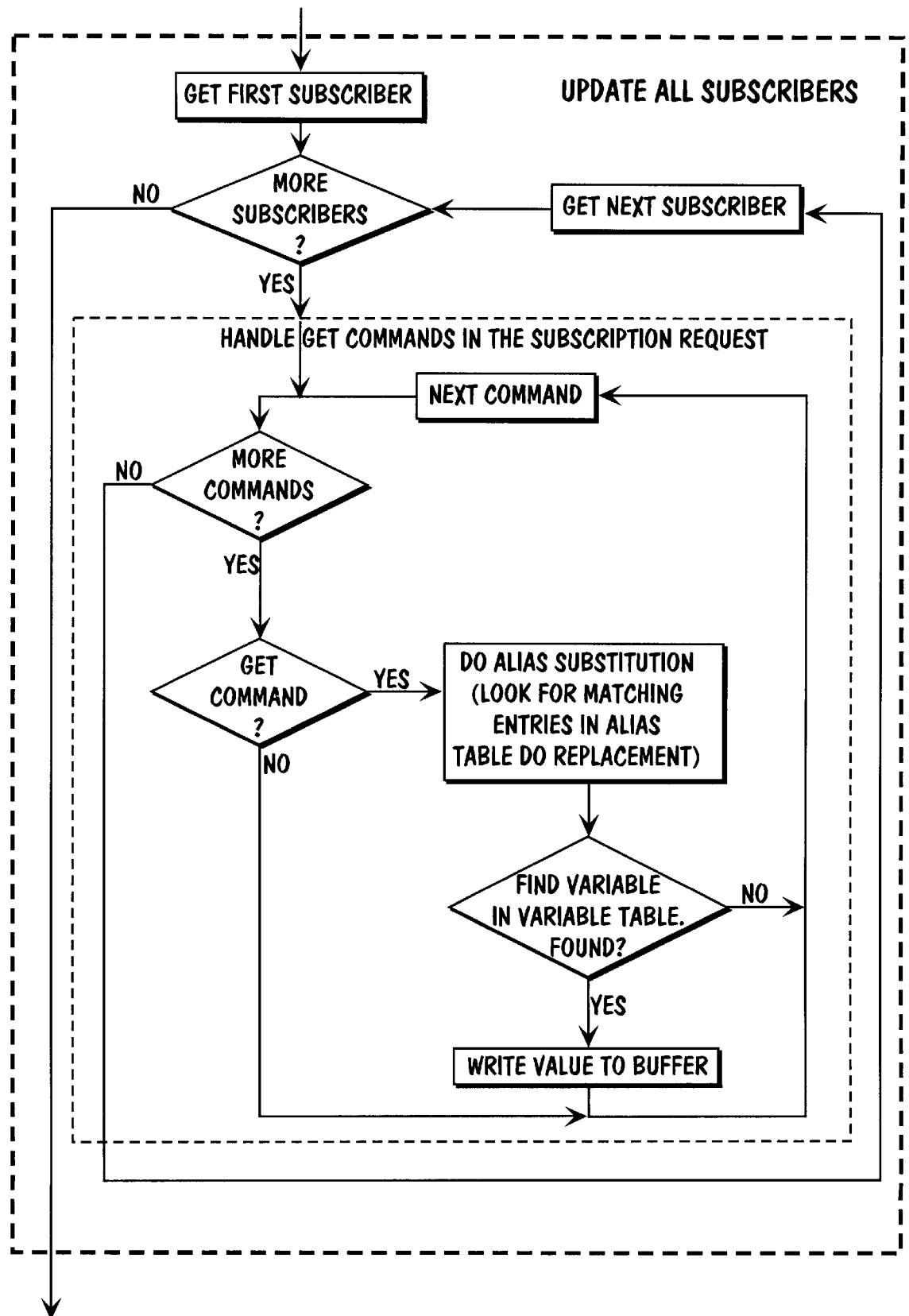

FIGS. 6–8 are flow diagrams showing the operation of an embodiment of the NEIOD in monitoring and controlling various devices that provide data. FIG. 6 is an overview of a monitoring and controlling process. FIG. 7 shows more detail of the "Handle Commands" operation of FIG. 6. FIG. 8 shows more detail of the "Send Updated Value" operation of FIG. 6.

Figure 9:
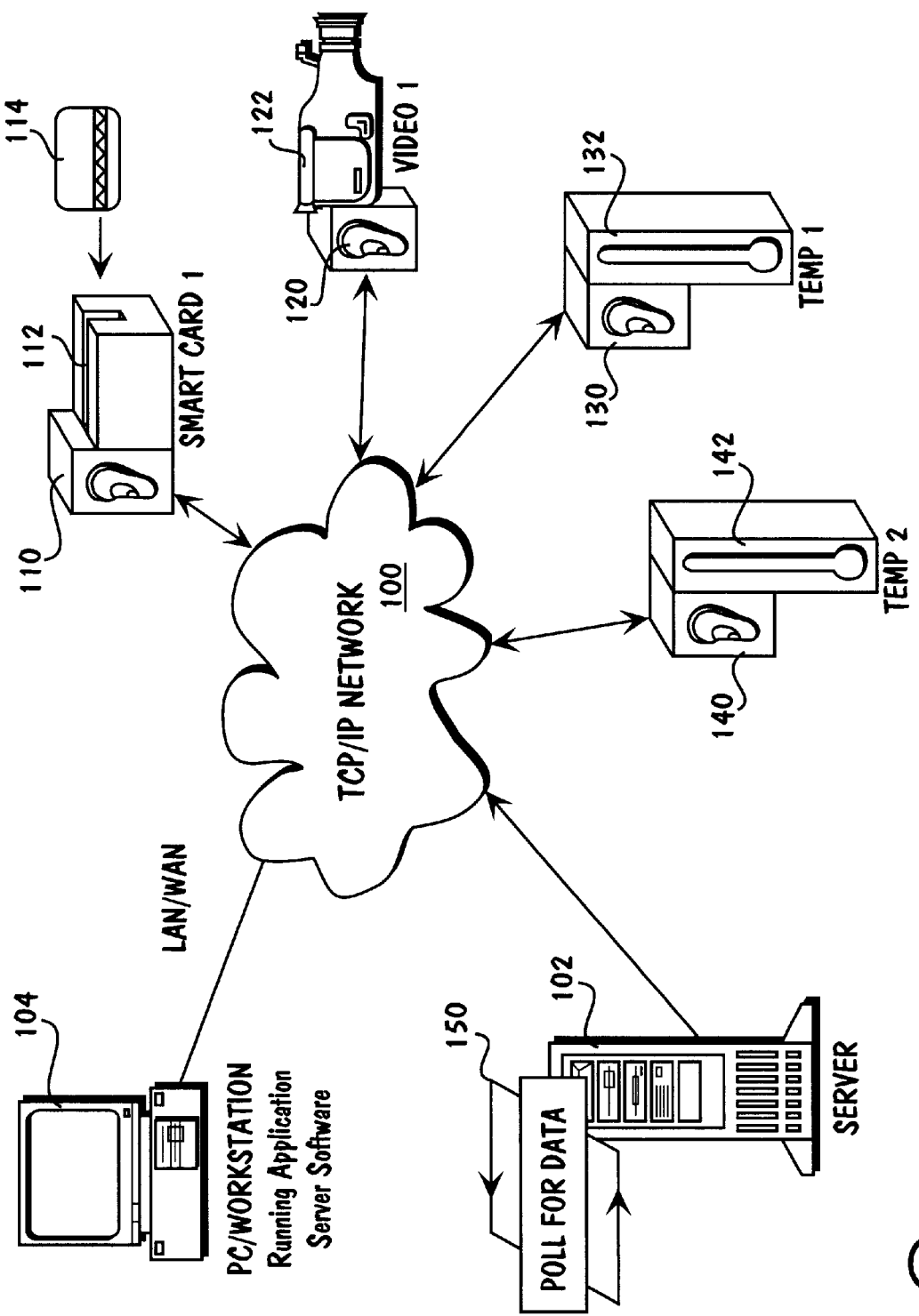
FIG. 9 is a diagram illustrating a server retrieving information over a network from a plurality of network enabled devices.

FIG. 9 shows a networked environment in which a plurality of networked peripheral devices communicate with a server. In the embodiment shown the server polls each of the of the network peripheral devices to see if they have any data to transfer and accepts that data in the event it is provided. This method of operation allows information from the multiple network peripheral devices to be stored centrally on the server. Thus, a record of temperature at a remote site or activities at a number of bar code and/or smart card readers or animations resulting from images retrieved from a remote site can be stored in the server. In this embodiment, a considerable portion of the server's time is spent in sending requests to network enabled devices that do not have a coincident need for the transmission of data.

FIG. 9 shows a server 102, a workstation 104, connected across a network 100 with a plurality of network enabled devices 112, 122, 132 and 142. Each of the network enabled devices 112, 122, 132, 144 include attached reply modules respectively 110, 120, 130 and 140. The reply modules receive requests for information directed to the corresponding network peripheral device over the network and transfer data from the network peripheral device in response to that request.

In operation the smart card reader 112 detects the presence of smart card 114 and exchanges information with that card. Information retrieved from the card is transferred to the server 102 during the subsequent polling interval generated by processes 150 resident on server 102. These processes, as discussed above, request data in, for example, round-robin fashion from each of the peripheral devices and place it in the server when it is available. The smart card reader 112, in one embodiment, is a network peripheral device that provides intermittent data. Data provided by the smart card reader is intermittent in the sense that it is likely to occur only when a card 114 is physically present in the corresponding cavity of the card reader.

The second network peripheral device, i.e. the video camera in one embodiment, is a network peripheral device that provides a continuous data stream of images. In this instance polling may be a very inefficient mechanism for achieving data transfer in that the polling interval may place a limit on the integrity of the animation stored in the server from the plurality of images retrieved across the network by the server from the peripheral device 122. The third and fourth network peripheral devices, respectively temperature indicator 132 and 142, may also be categorized as networked peripheral devices providing (continuous data transfer in that temperature is being monitored.

Figure 10:
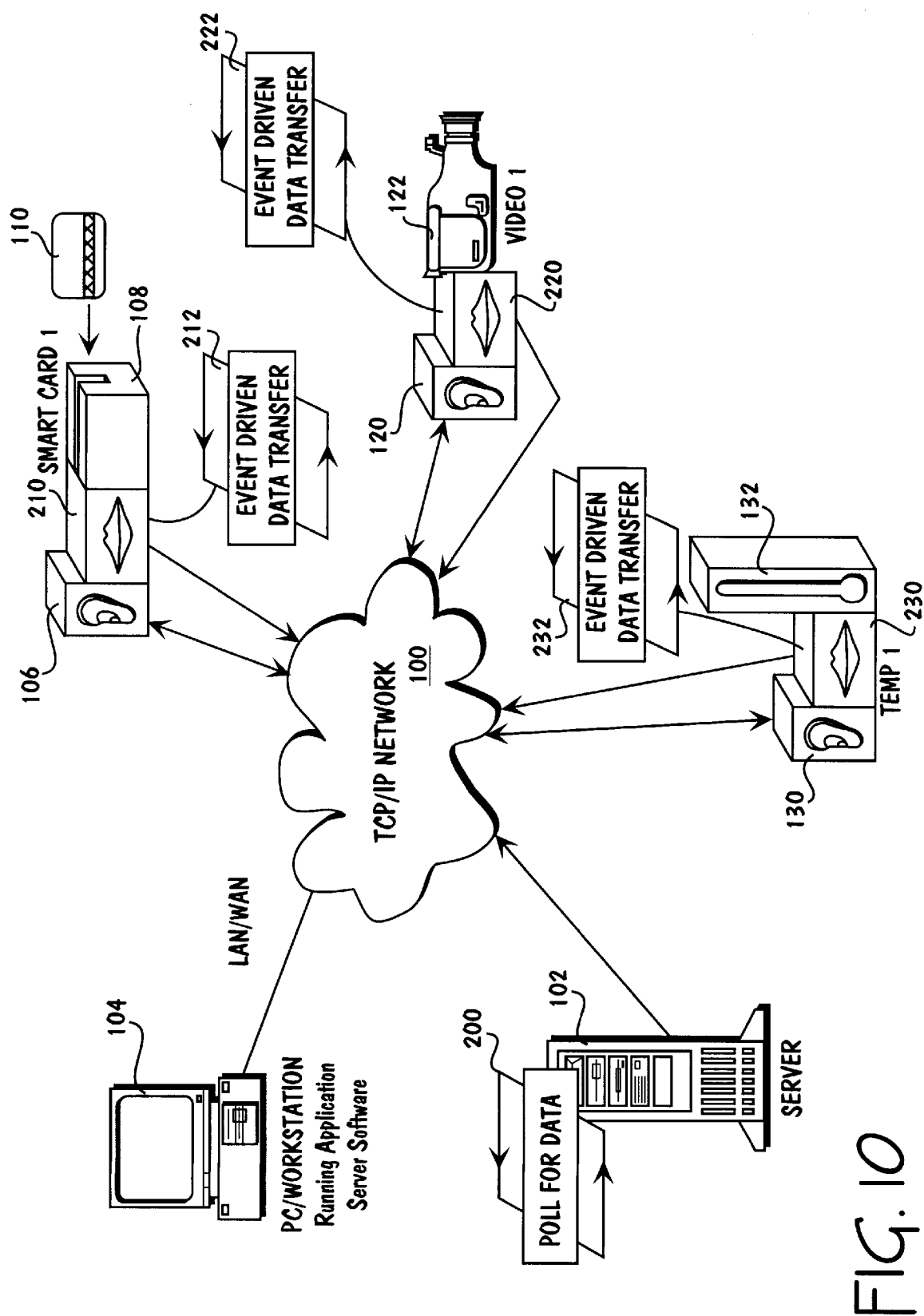
FIG. 10 shows the network enabled devices of FIG. 9 equipped with the additional capability of transferring data to the server upon the occurrence of a data transfer event.

FIG. 10 shows an embodiment of the current invention in which each of the network peripheral devices shown in FIG.

9 additionally includes a call module to initiate communications with the server when a data event has occurred. The networked peripheral devices 108, 122 and 132 shown in FIG. 9 attach cross network 100 to server 102. Network peripheral device 108, i.e. the smart card reader, interfaces with both a call and reply modules respectively 210, 106. Video camera 122 interfaces with the network 100 through both a call module 220 and a reply module 120. Temperature monitor 132 interfaces with the network through both a call module 230 and a reply module 130. Each of the call modules 210, 220, 230 include processes respectively 212, 222 and 232. Each of these processes is responsible for the detection of a data transfer event and for the transfer of data to the server 102 responsive to the data transfer event. The data transfer event can be user configured.

A data transfer event in the case of a smart card reader may be defined as the passage of a card through the reader. A data transfer event in the case of a video camera may be defined as the generation of the next frame of an animation. In the case of a still camera a data transfer event would be the taking of a picture. In the case of a temperature sensor a data transfer event could be defined as a continuous or discreet activity depending on the resolution with which temperature is to be monitored. In an embodiment of the invention, the user can request buffering by the network enabled device of data before initiating a transfer through the call modules to the server. In another embodiment of the current invention, the user can configure the network attached peripheral device to restrict the amount of data transferred from the continuous data stream provided by, for example, the temperature sensor 132 or the video camera 122. The user can set up the network peripheral device to discard temperature variations less than a certain amount and to only call for a data transfer when temperature variations greater than that amount have taken place. Buffering capabilities can also be defined by the user to further limit the amount of data transferred to the server.

Configuration capabilities exist in the call and reply modules, respectively 220 and 120, coupled to the video camera. The user can configure the modules to only accept frames of information representing significant variations in the image. In an embodiment of the current invention this could be defined by a comparison of the pixels of a current and previous image to see if pixels above a threshold amount had been altered. In the event such an alteration had not taken place, the image frame would be deemed insignificant and would be discarded. In an embodiment of the invention image frames containing significant data would be transmitted by the call module 220 at time of generation. In an alternate embodiment of the current invention significant image frames containing significant data would be buffered by the call module and transmitted to the server under predefined conditions including, for example, buffer size and time delay of transmission.

In the embodiment shown in FIG. 10 the listening modules 106, 120, 130 connected to, respectively, the smart card 108, the video camera 122 and the temperature sensor 132. These modules are responsive to queries/requests from the server. The server, in contrast to the server in FIG. 9, runs processes 200 for occasionally determining the status of the network peripheral device to which the modules are attached. Thus a server can track the operability of each of the network peripheral devices which are feeding it information without becoming involved in the extensive polling shown in FIG. 9 to actually obtain the information. The combination of event driven data transfers from the peripheral devices with intermittent polling by the server 102 to determine the status of each of the clients provides for a reliable environment for data transfer utilizing a minimum amount of bandwidth on the network and the server. These capabilities in combination allow potentially millions of peripheral devices on the Internet to communicate with one or more servers without excessive time delay or infrastructure bandwidth requirements.

In operation the insertion of a smart card 110 into the smart card reader 108 may constitute a data transfer event. The call module 210 will retrieve the information from the smart card reader 108 and will transfer that information across the network to the server 102.

Figure 11:
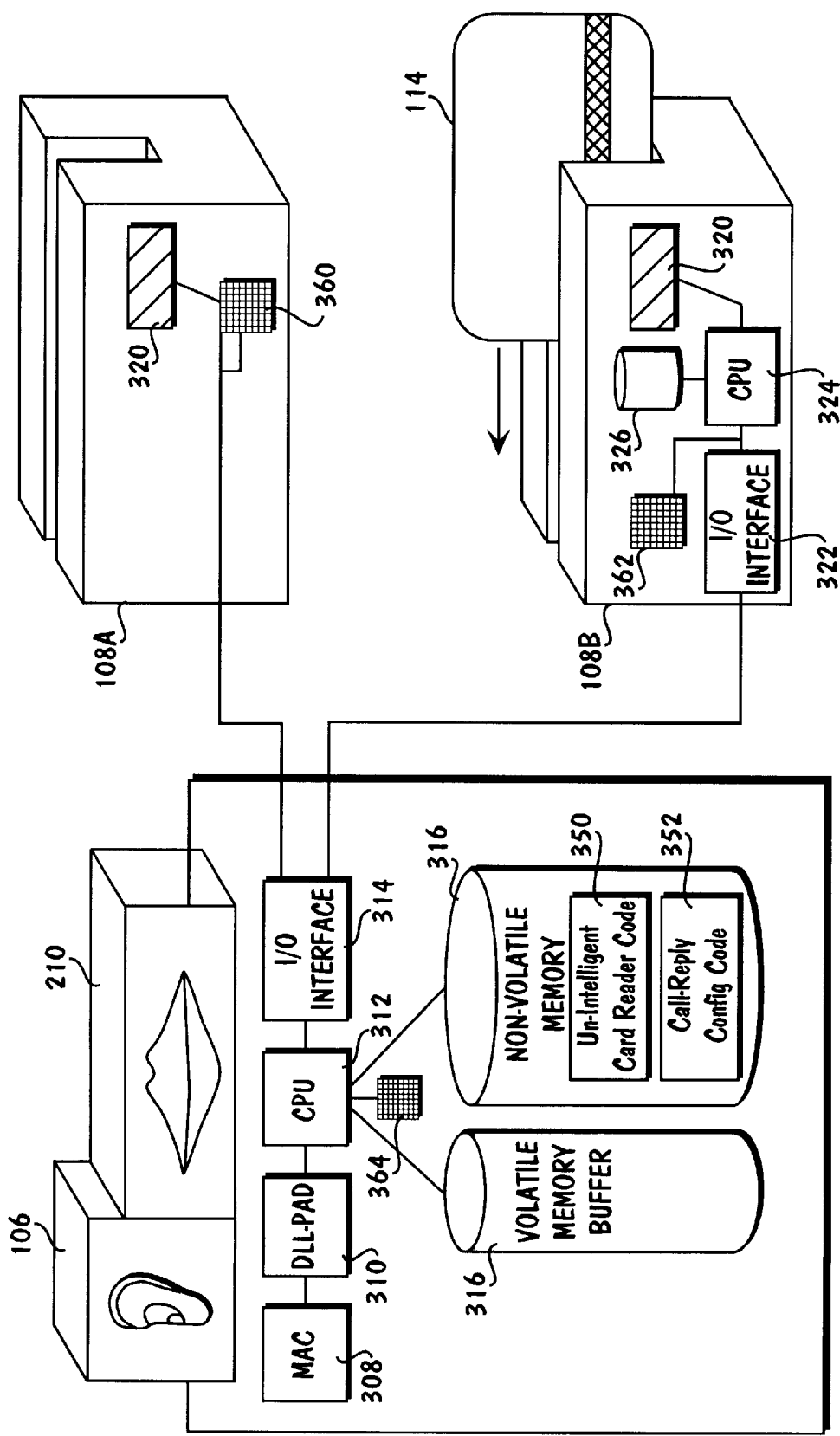
FIG. 11 is a hardware block diagram of a network enabled device according to one embodiment of the current invention.

FIG. 11 is a hardware block diagram of the network attach peripheral smart card reader 108 shown in FIG. 10. In the embodiment shown in FIG. 11 both an unintelligent smart card reader 108A and an intelligent smart card reader 108B are connected to the listening and reply modules respectively 106, 210. The listening and supply modules include a medium access controller (MAC) 308, a data link layer (DLL) packet assembler and disassembler (PAD) 310, a central processing unit (CPU) 312, an input-output (I/O) interface 314 and volatile and nonvolatile memories respectively 316–318. The unintelligent smart card reader includes a card interface 320. The intelligent smart card reader 108B includes a card interface 320, an I/O interface 322, a CPU 324 and a memory 326.

Within the listening and reply modules 106, 210 the MAC 308 interfaces with the network 100 (see FIGS. 9–10). The MAC 308 is connected via the DLL PAD 310 to the CPU 312. The CPU 312 interfaces with either of the card/smart card readers 108A–B through the I/O interface 314. The CPU 312 is connected to both memories 316–318. The detection unit 320 of the unintelligent smart card reader is connected to the I/O interface 314 of the listening and reply modules 106, 210. The I/O interface 322 of the intelligent smart card reader 108B is connected to the I/O interface 314 of the call and reply modules. The I/O interface 322 of the intelligent smart card reader is connected to the CPU 324. The CPU is connected to both the memory 326 and the detection unit 328.

In operation a card 114 placed in the intelligent smart card reader is processed in a manner well known to those skilled in the prior art. This may involve energizing the card, verifying the identity of the person holding the card through, for example, a biometric parameter such as a fingerprint of the holder of the card matching a fingerprint stored inside the card. Subject to the authentication the data in the card may be read and/or updated by the CPU 324 through the detection unit 328. The information retrieved from the card may be stored in memory 326 for subsequent transfer to the listening and reply modules 106, 210.

To assist in identifying the source of data transferred from either of the readers 108A–B a unique identifier, respectively 360–362, may be resident on the reader at the time of manufacture. Such an identifier could, for example, be a unique numerical sequence contained in a read only memory (ROM) fabricated on either of the devices at time of manufacture. This unique identifier would be passed along with data transferred from either of the units to the server and would allow the server to identify the type of device from which the data was being retrieved. The unique identifier may also have additional functionality, particularly desirable in the case of the unintelligent smart card reader 108A.

In the unintelligent smart card reader 108A, the unique identifier 360 may be utilized with particular advantage. For example, when the reply and call units 106, 210 is first connected to the network either it or the server may not be aware which type of peripheral device, e.g., smart card reader, video camera, temperature sensory are connected. The identifier 360 can be accessed by the CPU 312 to assist in this determination. The identifier can be appended to outgoing packets of data with which the server 102 (See FIGS. 9–10) can identify the type of data received.

Additionally, the configuration of a generic call and reply module with any number of peripheral devices can be accomplished on the network rather than in the factory. For example, when the call and reply module was first connected to the network it can send out a generic identifier 364 which indicates to the server what type of code 352 to download for the call and reply modules independent operation. Subsequently, the call and reply module can, when enabled, query any of the peripheral devices to which it is connected to find out what type of device it may be connected to. That determination can be made on the basis, in the example shown, of either the identifiers 360–362 or respectively, the unintelligent smart card reader and the intelligent smart card reader. Those identifiers can be read by CPU 312 and passed to the server. Subsequently, the server can download specific code 350 for the unintelligent smart card reader. This code enables the CPU 312 to both perform a network interface with call and reply capability and also to serve as a processor for the unintelligent smart card reader. This allows a more complete flexibility in the fabrication in and the assembly of call and reply modular with any of a number of peripheral devices. These capabilities additionally allow a single call and reply modular to interface with a plurality of network peripheral device type types. Finally, this functionality allows a more complete integration and therefore a lower cost of the combined call and reply module and peripheral device.

Figure 12:
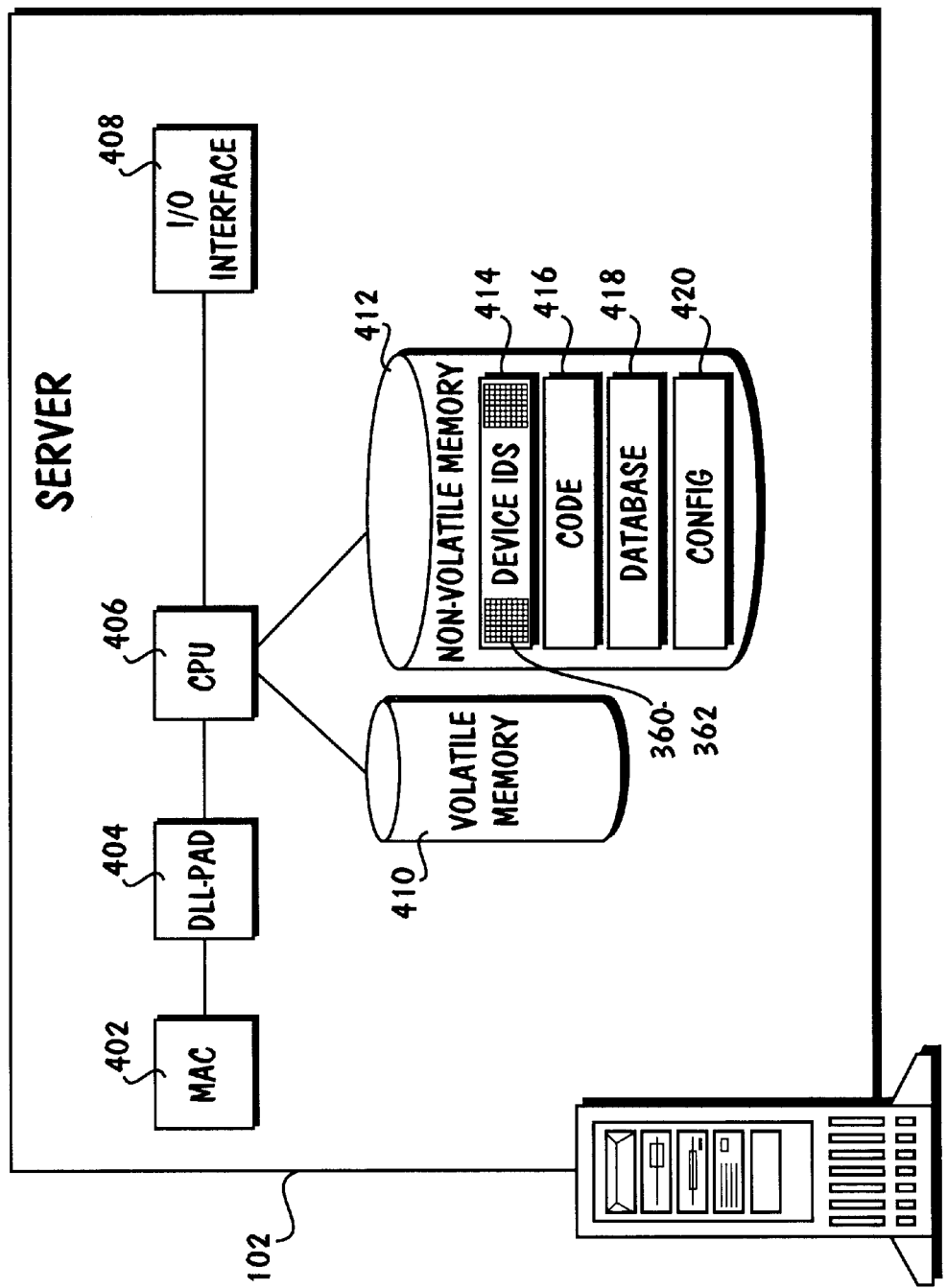
FIG. 12 is a hardware block diagram of a server for networked peripheral devices.

FIG. 12 is a hardware block diagram of the server 102 shown in FIG. 10. The server includes a medium access controller (MAC) 402, a DLL-PAD 404 a CPU 406 and memories 410–412. The MAC interfaces with the network 100. The DLL PAD interfaces 404, interfaces the MAC to the CPU 406. The CPU is coupled to both the memories 410–412.

In operation, a packet received from the network is detected by the MAC 402 and passed to the Data Link Layer Pad 402 for removal of the Start and End of Frame Flags and other fields associated with transmission of the packet across the network in either a point-to-point or a packet switched mode. The payload wrapped in the session transport and network layer headers is passed to the CPU for further processing. The CPU extracts device identifications (IDs) and payload and makes corresponding entries in device ID table 414 and the data base for 418 within memory for 412. Device IDs 360–362 corresponding to the non-intelligent and intelligent network interface devices described and discussed above are shown in device table 414. When a packet is being sent to the Network 100, the CPU 406, DLL PAD 404, and MAC 402 provide the function of wrapping the outgoing data in the corresponding headers and an appropriate destination address to an outgoing packet or frame.

Figure 13:
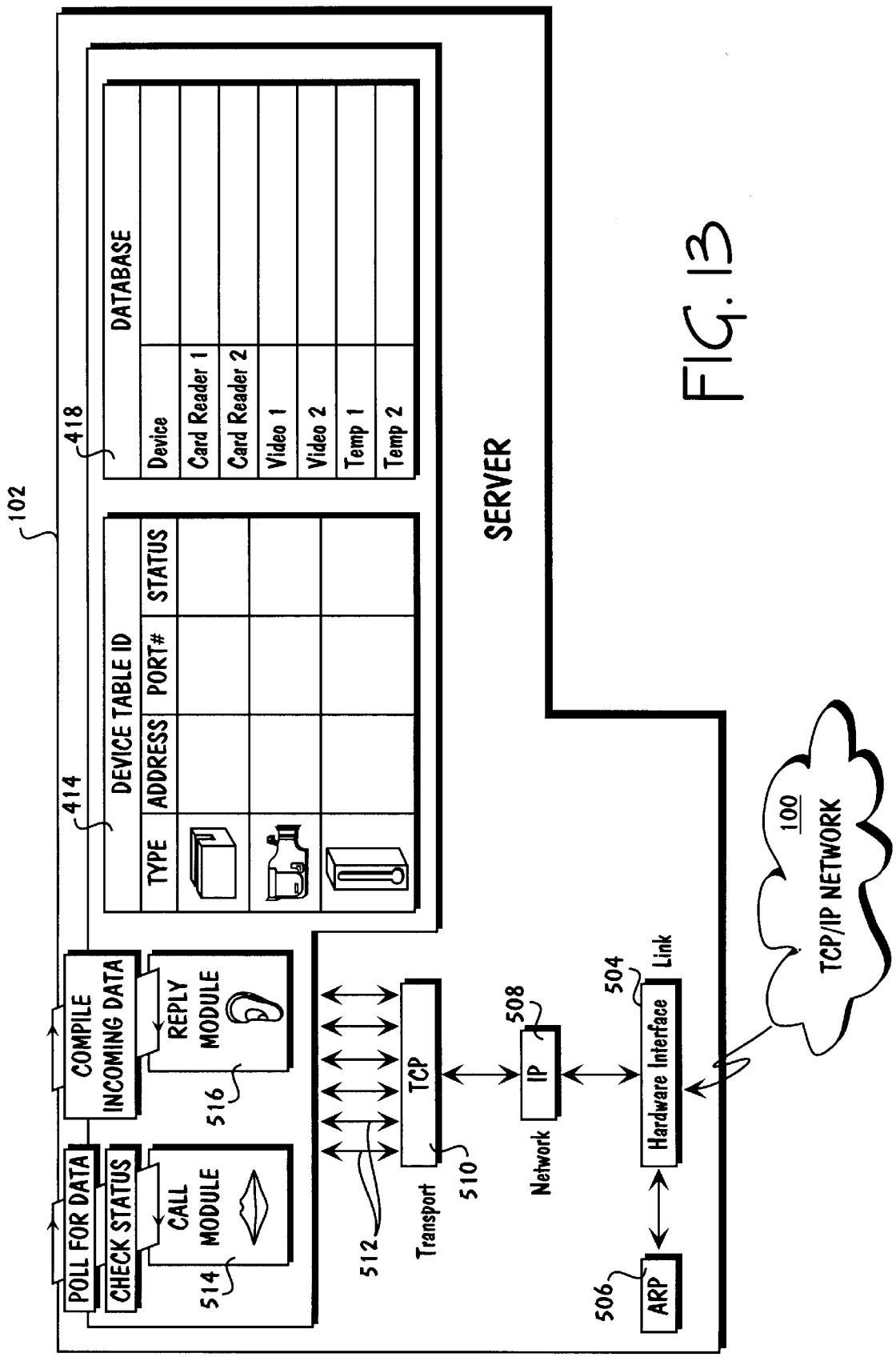
FIG. 13 shows the software modules and data structures associated with the server shown in FIG. 12.

FIG. 13 shows the software modules and data structures associated with the Server 102 shown in FIG. 11. The modules include a hardware Interface 534 and address resolution protocol (ARP) 506 module and Internet protocol [IP] Module 508. A transmission control protocol module (TCP) 510 Call Module 514, Reply Module 516, Device Table 414, and Data Base 418.

The Device Table contains records for those networked enabled devices from which the server has received data. For each device type, an address, a port or socket number and a status may be recorded. In an embodiment of the invention, the status field of each record contains information indicating whether or not, the particular device is still accessible by the server. This information may be kept in the form of a time stamp as to the date of last packet received or a time-stamp as to the date at which a status check was last responded to. The data base and embodiment contains for each device, an historical record of the data provided by the device over time.

In operation, the Call Module implements processes for checking on the status of the peripheral devices in the device Table 414 to determine for example whether they are connectable or not. The call module processes 520 also include the capability for performing for polling data for all of the devices listed in the device table 414 and for recording that data in the database 418. This latter functionality of the call module, however, has the disadvantages discussed above, for example of excessive use of limited network bandwidth, as well as server processing capability. The reply module 516 implements processes 522 for receiving, categorizing and compiling incoming data provided by a complimentary call module (e.g., call modules 210, 220, and 230). Processes implemented on this module allow for efficient utilization of limited server bandwidths. Efficiency within the server resulting from the use of reply module processes 522 is in part related to the number of concurrent ports/sockets 512 which need to be processed at the transport layer 510. When the reply modules processes are active, ports 512 are only allocated during the interval of a connection. As each session is closed, the port allocated to that session is itself closed and possibly reallocated to another session. This cuts down on the processing by the server associated with analyzing the destination address of each packet for a large number of connections, few of which are actually providing data. Instead, a minimum number of connections is maintained because the peripheral devices themselves are using event driven data transfer processes, e.g., 212, 222, 232, to transfer data to the server on an as-provided basis. The call module's primary faction when the reply modules processes 522 are active is to check occasionally at pre-defined intervals for status, particularly of those nodes connected to peripheral devices which have not connected to the server recently. This allows the status of the network to be checked.

Figure 14:
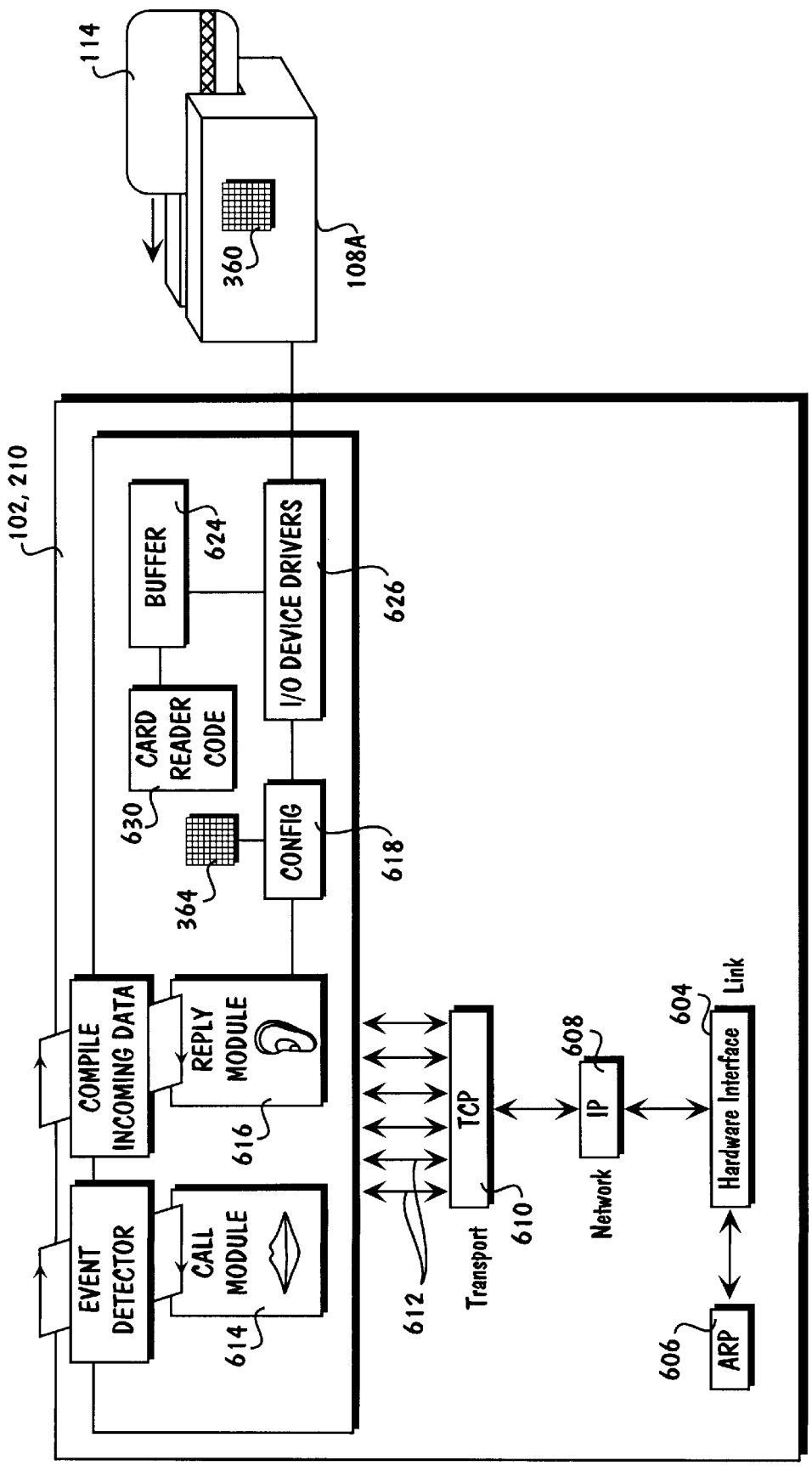
FIG. 14 shows the software modules associated with the network enabled device shown in FIG. 11.

FIG. 14 is a software module diagram for the combination of the call and reply modules 106, 210, and the non-intelligent SMART Card Reader 108A described and discussed above. The call and reply units include hardware interface module 604 ARP module 606, IP module 608, TCP module 610, call module 614, reply module 616, configuration module 618, buffer 624, I/O device driver 626, and unique identifier 364. The hardware interface module 604 is connection to the network 100. The hardware interface module is connected to both the ARP module 606 and the IP module 608. The IP module is connected with the TCP module which is in turn connected to the either or both of the call module 614 and reply module 616. The call and reply modules are connected to the configuration modules 618. The configuration modules communicate with the I/O device driver 626 and the buffer 624. The configuration module 364 can access the unique identifier 364. Either of the call or reply modules also communicate with resident card reader code 630 to control the operations of the non-intelligent SMART Card Reader 108A. These processes include the capability for detecting a data transfer event and for determining the data to be transferred is significant or not and further whether the data is to be buffered and if so for what time or in what amount.

In operation, the call module implements processes 620 jointly with the reply module 622 for managing the card reader to determine for example when a card is in the reader and to obtain a reading and interaction and data transfer therewith. The call module also implements processes for detecting an event such as the insertion of a card 114 into the card Reader and for the subsequent transfer of data to buffer 624 for subsequent transmission over the network. The reply module 16 responds to requests for data received from the network by providing data from the buffer 624. In an embodiment of the invention, operation commences with all the code, e.g., card reader code, and configuration code and device drivers resident on the call/reply unit. The reply module is activated and has programmed into it at time of assembly, a target address corresponding to the destination address to which the Reply Module should send data. This functionality would be useful for example in products sold to consumers which then could be coupled to the Internet and monitored by the manufacturers so that diagnostics and servicing, at appropriate time, could be performed. Thus, the manufacturer of refrigerators or light bulbs could monitor the power consumption and operation of their devices, provided only that the devices can communicate over the Internet. The communication capability could be achieved, for example, by having a modulated signal placed on the AC current with which the device is powered and a corresponding node at the house to both retrieve information, wirelessly or in the form of a modulated AC signal from the network enabled devices and transmit this to the target address of the vendor over the Internet.

In an alternate embodiment of the current invention, the card reader code would not be present on the call/reply unit at time of activation. Instead, at the time of activation, the call/reply module would communicate over a network connection with a node on the network from which appropriate card reader code could be downloaded. This operation could commence with processes 620–622 querying the card reader 108A and specifically the unique identifier 360 to determine that the device to which the call/reply unit was detected was in fact a card reader and further the specific type and parameters of that card reader. This information can then be communicated by the call module over the Internet to the server having the appropriate card reader code which would be downloaded into card reader module 630. With the card reader, thus enabled, the normal processes of either or both of the call and reply modules would commence.

In an alternate embodiment of the invention, the call/reply unit would obtain a list of one or more target servers to which significant data events should be communicated. This list could be programmed into the call/reply unit at time of manufacturer or could be sent to the unit by any node on the network at time of connection to the network. The reply module would send to each of the nodes on the list the data obtained by the SMART card reader 108A. The call and reply modules communicate through port 612 at the transport layer 610 to send and receive information from the network.

Protocols

Figure 15:
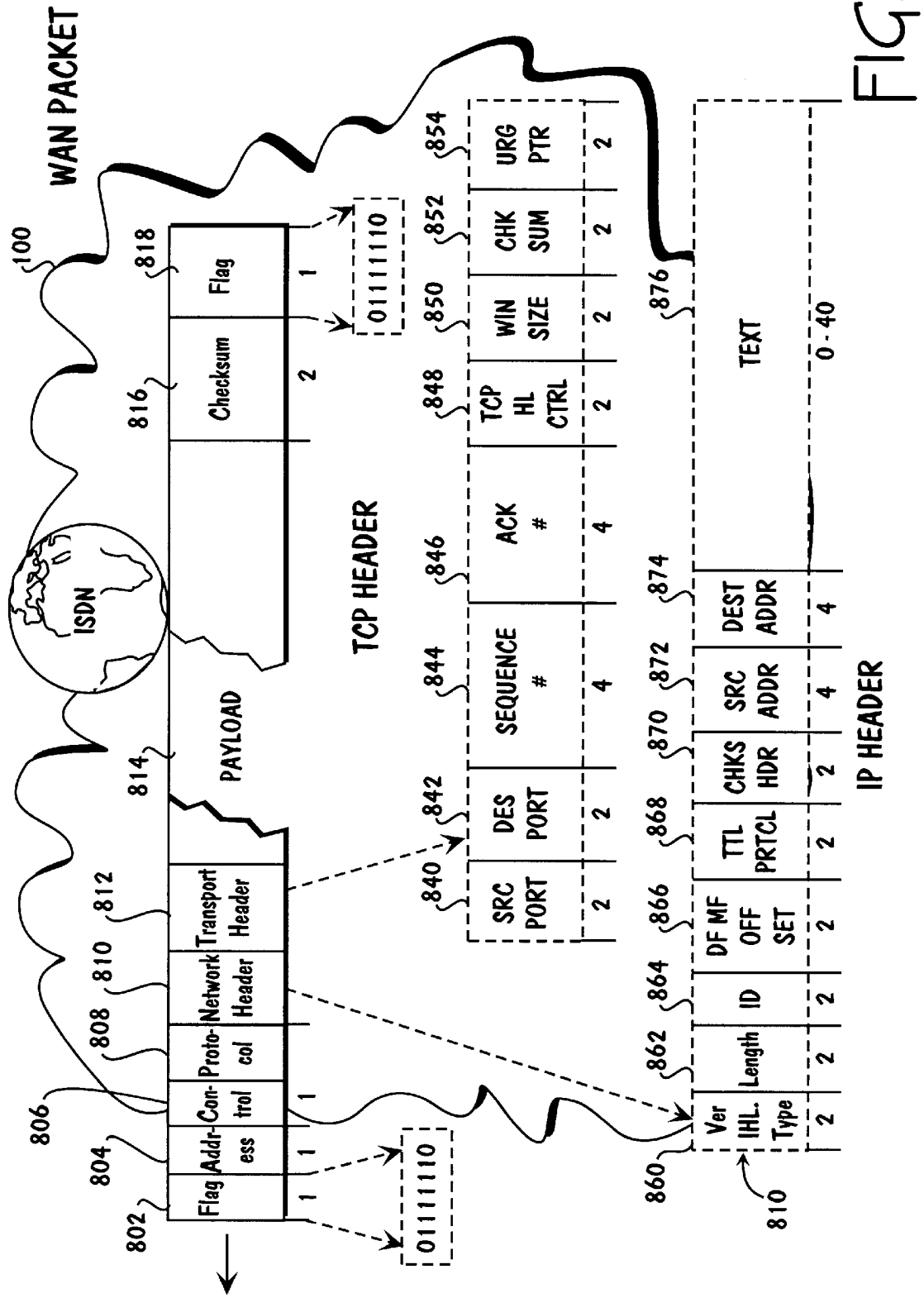

Information transferred across networks does so with wrapping protocols for the information being transferred. Each packet contains a plurality of headers and payload. The headers contain information specific to one of the corresponding seven layers of the open systems interconnection (OSI) model. FIGS. 14A–B and FIG. 15 show an embodiment of the packet protocols on a packet switched local area network (LAN) and on a wide area network (WAN), implementing a point-to-point protocol (PPP). Headers and payload on a LAN are referred to as a packet. Headers and payload on a point-to-point network such as the integrated services digital network (ISDN) may be referred to as frames.

Until recently network traffic on either a LAN or ISDN network comprised packets/frames with up to seven headers, and a payload. The headers contained information specific to each of the seven layers of the OSI model. The payload contains the audio, video, or data being transferred. On the LAN the structure of headers and payload is specified by the respective IEEE LAN standard such as 802.3, 802.5 etc. These standards are hereinafter referred to as 802.x. On the ISDN side the structure of the headers and payload is specified by the PPP protocol or the High-Level Data Link Control (HDLC) protocols promulgated by the International Standards Organization (ISO).

Both IEEE 802 LANs and ISDN are structured by architecture closely following the OSI (OSI) Seven Layer Reference Model. The OSI model decomposes a communication system into seven major components or layers which are defined by international standards. The OSI model is concerned with the interconnection between systems, i.e., the way they exchange information, and not with the internal functions that are performed by a given system. Communications between systems are organized into information that is exchanged between entities at each layer. The mechanism for communication between two systems at a single layer is referred to as a protocol, i.e., "a layer x protocol."

The first layer is known as the physical layer and is responsible for the transmission of bit streams across a particular physical transmission medium. This layer involves a connection between two machines that allows electrical signals to be exchanged between them.

The second layer is the data link layer (DLL), and is responsible for providing reliable data transmission from one node to another and for shielding higher layers from any concerns about the physical transmission medium. It is concerned with the error-free transmission of frames of data.

The third layer, the network layer (NL), is concerned with routing data from one network node to another and is responsible for establishing, maintaining, and terminating the network connection between two users and for transferring data along that connection. There is normally only one network connection between two given users, although there can be many possible routes from which to choose when the particular connection is established.

The fourth layer is the transport layer (TL), and is responsible for providing data transfer between two users at an agreed on level of quality. When a connection is established between two users, the transport layer is responsible for selecting a particular class of service to be used, for monitoring transmissions to ensure the appropriate service quality is maintained, and for notifying the users if it is not.

The fifth layer is the session layer, and it focuses on providing services used to organize and synchronize the dialog that takes place between users and to manage the data exchange. A primary concern of the session layer is controlling when users can send and receive, based on whether they can send and receive concurrently or alternately.

The sixth layer is the presentation layer, and is responsible for the presentation of information in a way that is meaningful to network users. This may include character code translation, data conversion or data compression and expansion.

The seventh layer is the application layer, and it provides a means for application processes to access the system interconnection facilities in order to exchange information. This includes services used to establish and terminate the connections between users and to monitor and manage the systems being interconnected and the various resources they employ.

FIG. 14A shows a detailed view of one of the possible packet types which can be transmitted over the network. The details of the wrappers for a packet are shown. Specifically, the protocol for this packet conforms with the IEEE 802.3 specification. The 802.3 packet begins with a preamble 700. The preamble is seven bytes in length with each byte containing the bit pattern 10101010. The preamble allows the receiver's clock to synchronize with the sender. Next comes the start of frame flag 702 containing the binary sequence 10101011. Next is the destination address 704 which is six bytes in length followed by a source address 706 which is also six bytes in length. The length field 708 follows. The length field which is two bytes in length indicates how many bytes are present in the data/payload field from a minimum of zero to a maximum of 1500 bytes. Headers 710–714 contain respectively the network layer, transport layer, and session layer headers for the payload field 716. The payload may contain various types of information including: modem session setup commands, session parameters, or data. Data may be audio, video, or textual. Immediately following the payload is checksum field 736.

FIG. 14B shows details of an embodiment of the transport layer/header/field. The embodiment shown in FIG. 14B implements the transmission control protocol (TCP) which has become a standard for the Internet. Each machine supporting TCP has a TCP transport entity that manages TCP streams and interfaces with the Internet protocol (IP)— protocol which is implemented in the network layer header 710. The TCP header contains the information necessary to make sure information is properly delivered and retransmitted, if necessary, to make sure that information is received in the proper order.

The first of the TCP fields are fields 750–752, respectively the source and destination port. These identify the local end points of the connection. Each host may decide for itself how to allocate its port starting at acknowledgment field 756. A port plus its host IP/network layer address performs a 48-bit unique transport service access point (TSAP). To obtain TCP service, a connection must be explicitly established between a socket on the sending machine and a socket on the receiving machine. Field 754 the sequence number field establishes the ordering for packets in a session. Acknowledgment field 756, the acknowledgment field, specifies the next byte expected. Both fields 754 and 756 are 32-bits long because every byte of data is numbered in a TCP stream. Fields 758 define both the length of the header as well as having a series of control bits. Field 760, the windows size field is used in conjunction with acknowledgment field 756 to provide flow control capability. For example, a window field value of 0 and an acknowledgment field value of N+1 indicates that N bytes of information have been received but the receiver would like no more data to be sent for the moment. Permission to send may be granted in a later packet by sending a packet with the same acknowledgment number but a non-zero window field. The next field 762 is the checksum field. This field is provided for reliability. The next field 764 may include a pointer to a portion of the raw data field 730 which contains urgent data, and an option field to provide additional control capability and a data field.

FIG. 15 shows the overall construction of a packet on a WAN adhering to the point-to-point protocol (PPP). The packet begins with the standard HDLC flag 802. The flag consists of the bit sequence (01111110). Next is the address field 804 which is always set to the binary value 11111111 to indicate that all stations are to accept the frame. Using this value avoids the issue of having to assign data link addresses. The next field is the control field 806. The default value of which is 00000011. This value indicates an unnumbered frame. In other words, PPP does not provide reliable transmission using sequence numbers and acknowledgments as the default. In noisy environments such as wireless network reliable transmission using numbered mode can be utilized as detailed in RFC 1663. A fourth field unique to PPP, i.e. the protocol field 808 tells what kind of packet is in the payload field. Following the protocol field are one or more series of network, transport, and session headers (not shown), respectively 810–812. The network header field contains information which identifies whether the following field, i.e. the transport header 312 implements a TCP header. Next is the payload 814 which may contain data. After the payload fields comes the checksum field 816. After checksum field comes the end of frame flag 818 which contains the same bit sequence as the starter frame flag 802.

In the example shown the network layer (NL) is implementing with an internet protocol (IP). The IP header 810 has three fields, 860 comprising the first two bytes of the header. These record the version number, the header length and the type of service expressed in terms of reliability and speed that is required for the frame. The next field, the length field 862 is two bytes in length and indicates the total length of everything in the datagram, including both header and data. The next field the identification field 864 which is two bytes in length and allows the destination host to determine which datagram a newly arrived fragment belongs to. All the fragments of a datagram contain the same identification value. The next two bytes 866 contain three fields for controlling, recording and sequencing datagram fragmentation. The next two bytes, segment 868 contain the time to live and protocol fields. The time to live field is a counter used to limit packet lifetimes. The protocol field tells the network layer which transport process to give the packet to. Transport control protocol (TCP) is one possibility, but so are user datagram protocol (UDP) and some others. The number of protocols is global across the entire internet and is defined in RFC 1700. The next two byte field 870 is the header check sum field which verifies the header only and is useful for detecting errors generated by bad memory words inside a router. The next two fields 872–874 are each 4 bytes in length and contain respectively the source and destination addresses. These addresses are hierarchically laid out in order to allow for intelligent network routing. The final field which is optional is a text field 876 from 0–40 bytes in length.

Immediately following the network header 810 is a transport layer (TL) header 812 which, in the example shown, implements the transport control protocol (TCP). This header is also 20 bytes in length. The first 2 bytes comprise fields 840–842 for, respectively, the source port and the destination port. The source and destination port fields identify the local endpoints of the connection. Each host may decide for itself how to allocate its own ports numbered from 1–256. A port plus its hosts network layer address forms a unique address. The next two fields, 844–846 each 4 bytes in length are, respectively, the sequence number and acknowledgment number fields. These provide for the in order transmission and acknowledgment of packets. Every byte of data is numbered in a TCP stream. The next two byte segments 848 comprise several control fields including a TCP header length field followed by a series of one bit flags for controlling the urgency, acknowledgment, synchronization and completion of transmission. The next 2 byte fields 850 indicate the window size which tells how many bytes may be sent starting at the byte acknowledged. The next field 852, 2 bytes in length, is the check sum field. It is provided for extreme reliability and check sums the header and data. The next field 854 also 2 bytes in length is a pseudo header. Thus because an HDLC frame contains DLL, NL, and TL headers there is a considerable overhead, i.e. headers and associated processing, associated with the transmission of payload in an HDLC format.

Figure 16B:
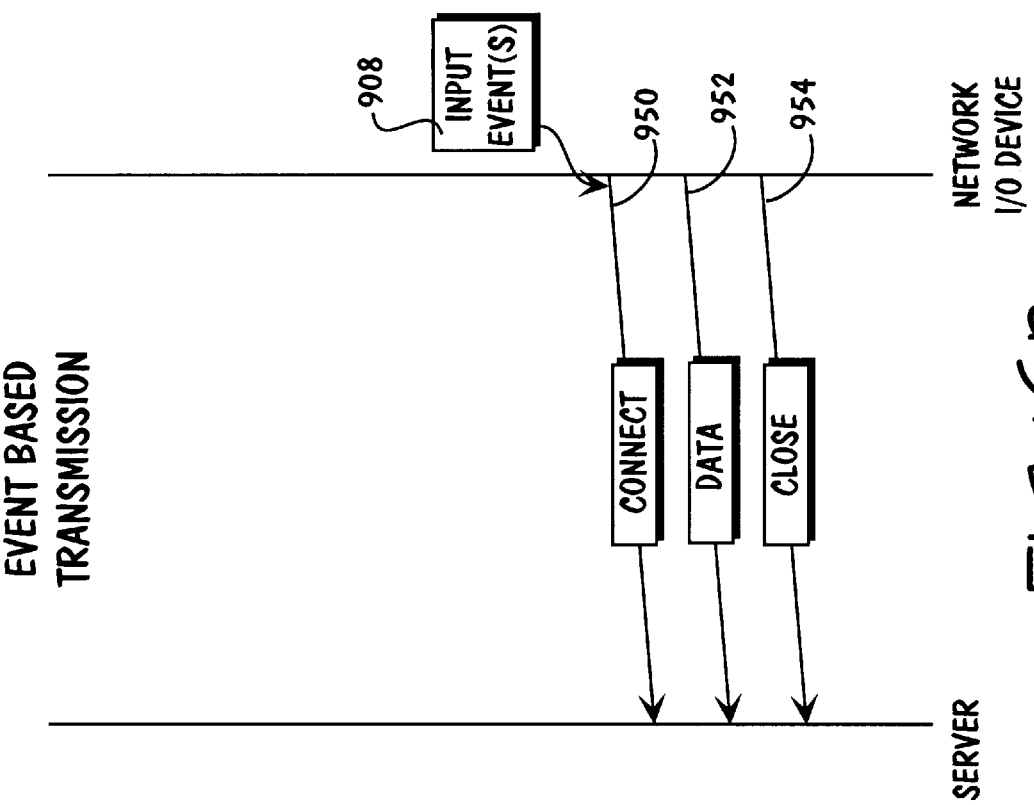
FIGS. 16A–F are diagrams showing representative communications between network enabled peripheral devices and a server.
Figure 16A:
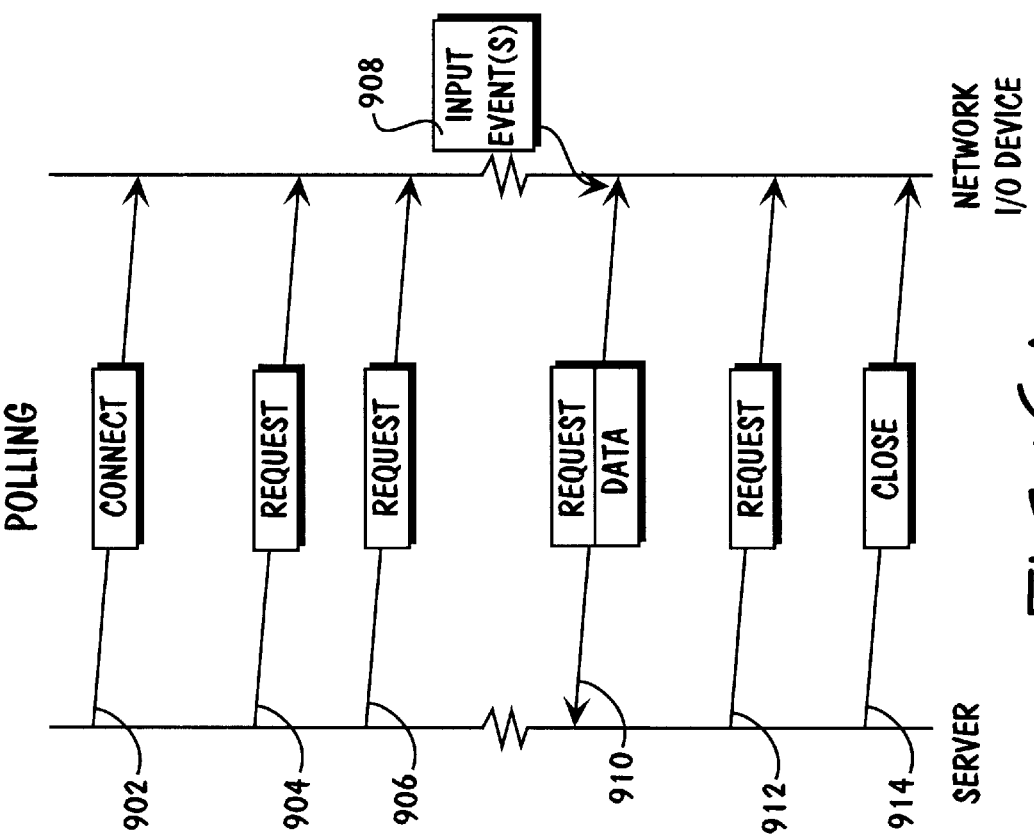

FIGS. 16A–B are diagrams of communications between a server and a networked peripheral device in, respectively, a polling and event driven data gathering scenario. In a polling scenario shown in FIG. 16A, a server initiates a connection 902 with the network peripheral device. Subsequently the server sends out to, and for example serial round-robin fashion, all the peripheral devices to which it is connected a request for data. A plurality of requests 904–912 are shown. Only one of those requests in the example shown, i.e. request 910, results in the return of data to the server. That data was provided by an input event 908 on the network peripheral device. The excess use of bandwidth on the network end and on the processors of either or both the server and network I/O device is easily visible by comparison with FIG. 16B.

In FIG. 16B the same amount of data is retrieved without the needless processing and network communication that accompanies the polling technique. In accordance with an embodiment of the current invention as shown in FIG. 16B, the input event 908 results in the intelligent network I/O device establishing a connection 950 with a target server. The network I/O device then sends the Data 950 to the target server. The transmission of data may be in response to a request from the server or, in a preferred embodiment, at the initiative of the network I/O device alone. Subsequent to expiration of a timeout interval after the transmission of data, the connection is closed 954 on the initiation of the network I/O device. The closure may also alternatively be initiated by the server.

In the event based transmission scenario of FIG. 16B a series of network peripheral devices are able to communicate with one or more target servers without the associated costs in terms of bandwidth at a network or processor level of the polling technique shown in FIG. 16A. In an embodiment of the invention, polling may still be useful from the server to the plurality of network I/O devices at a relaxed interval associated with obtaining status information on each of the network I/O devices and particularly those devices which have not been in communication with the server for a significant interval.

FIG. 16C–F show in greater detail the communications on either a point-to-point or packet-switched network associated with the connection request date of transfer and closures steps described above in connection with FIGS. 16A–B.

Figure 16C:
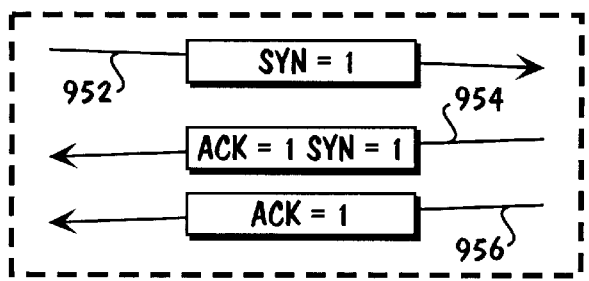
Figure 16C:
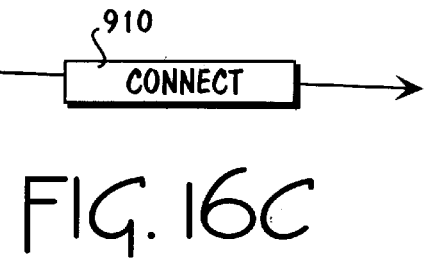

In FIG. 16C, a connection 910 and the actual packet transmissions associated therewith are shown in greater detail. The initiating party sends a packet 952 lo the party with which it wishes to establish a connection. That packet has the SYN bit at a logic one. That indicates to the receiving party that the requesting party wants to initiate a connection. The receiving party acknowledges the connection request by sending a Packet 954 in which both the ACK and SYN bits are logic one. The final stage of a connection is an acknowledgement in the form of an ACK bit equals logic one sent from the requesting party to the receiving party. At the software level, a connection involves the, establishment of a port and/or sockets by the transport level processes in both the sending and receiving party. The connection requires overhead in terms of the resident processes analyzing in-coming packets to determine if they have a port ID 810 (see FIG. 15) corresponding to an allocated port.

Figure 16D:
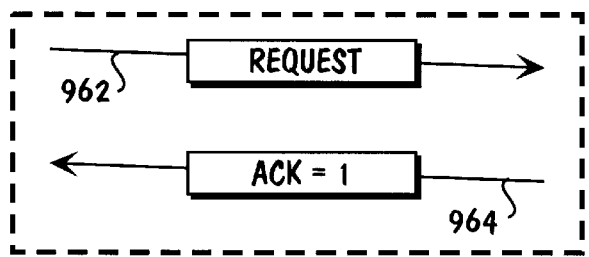
Figure 16D:
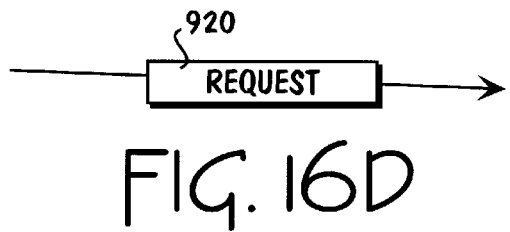

FIG. 16D shows greater detail of the packet associated with a request for Data 920. The requesting party sends a Request Packet 972 and the party receiving the request acknowledges the Request 964 with a packet in which the ACK bit is logic one.

Figure 16E:
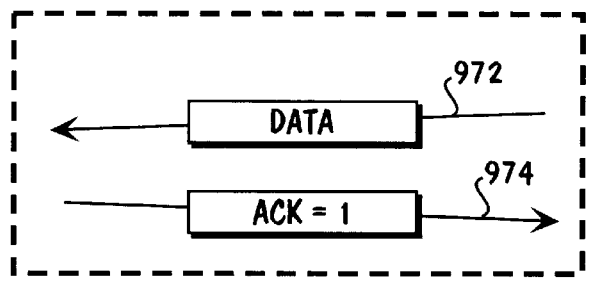
Figure 16E:
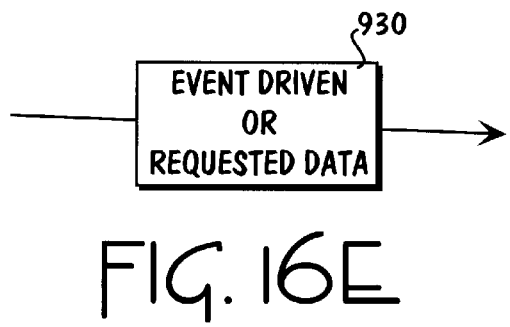

In FIG. 16E the greater detail on event driven data transfer or data transfer aid response to a data request as shown in FIG. 16D are shown. A transferring party sends data 972 in the payload portion of a packet. The receiving party sends a responsive packet 974 in which the ACK bit is logic one.

Figure 16F:
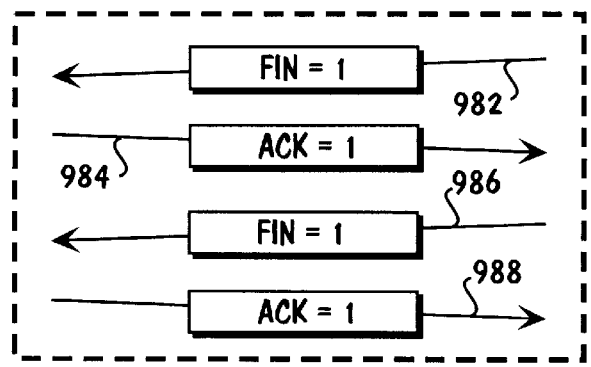
Figure 16F:
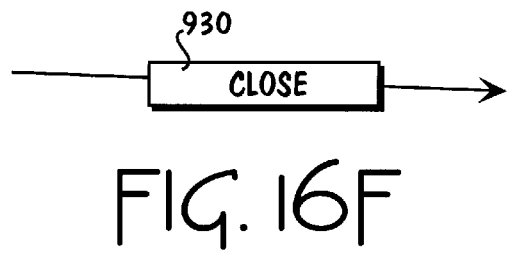

FIG. 16F shows the four packet transfers associated with a closing a 930, a network connection. The party seeking to close the connection, sends a packet 982 in which the FIN bit equals logic one. The party receiving the packet sends an acknowledgment 981 packet in which the ACK bit is logic one.

Figure 17:
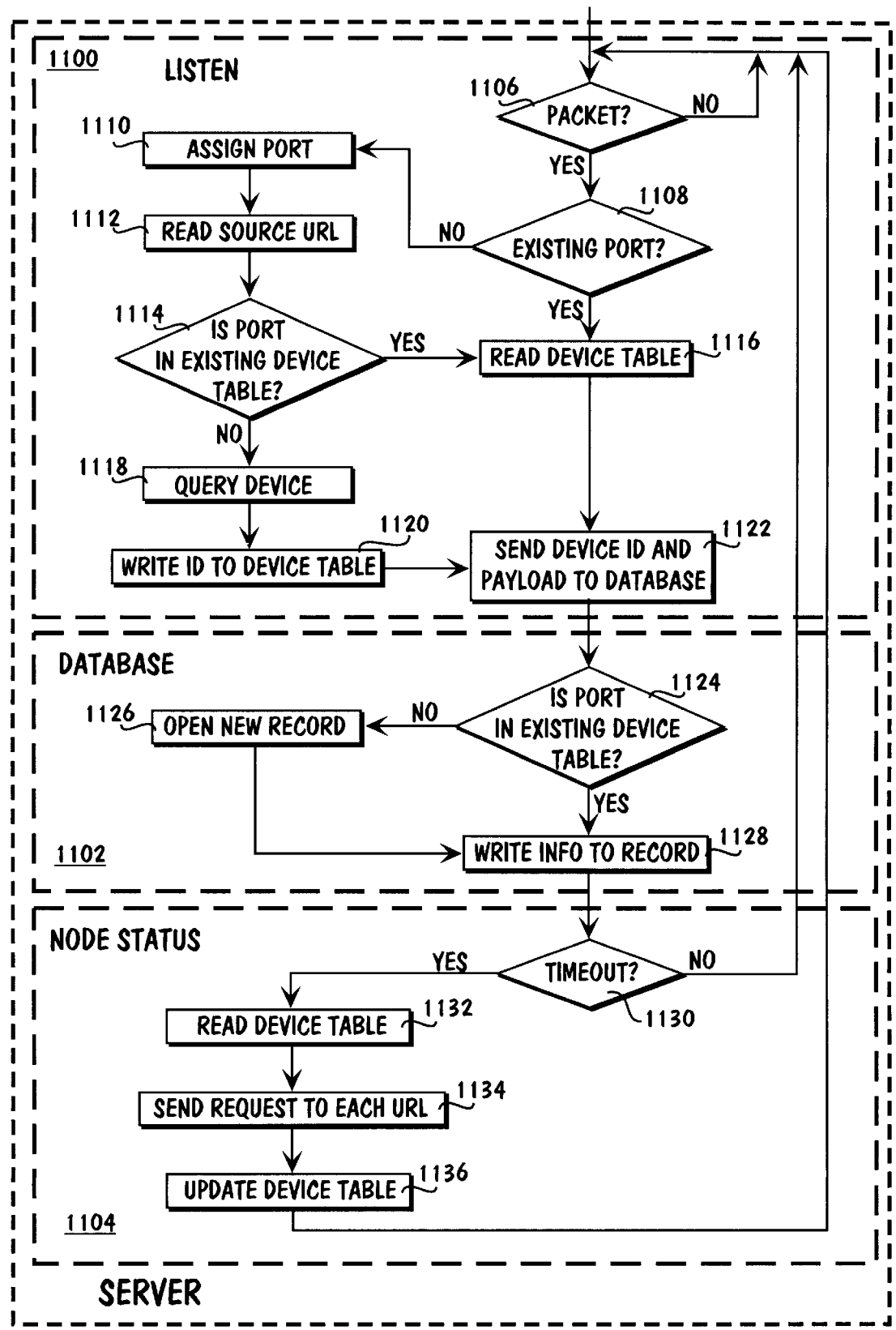
FIG. 17 is a process flow diagram for a server communicating with networked peripheral devices.
Figure 18:
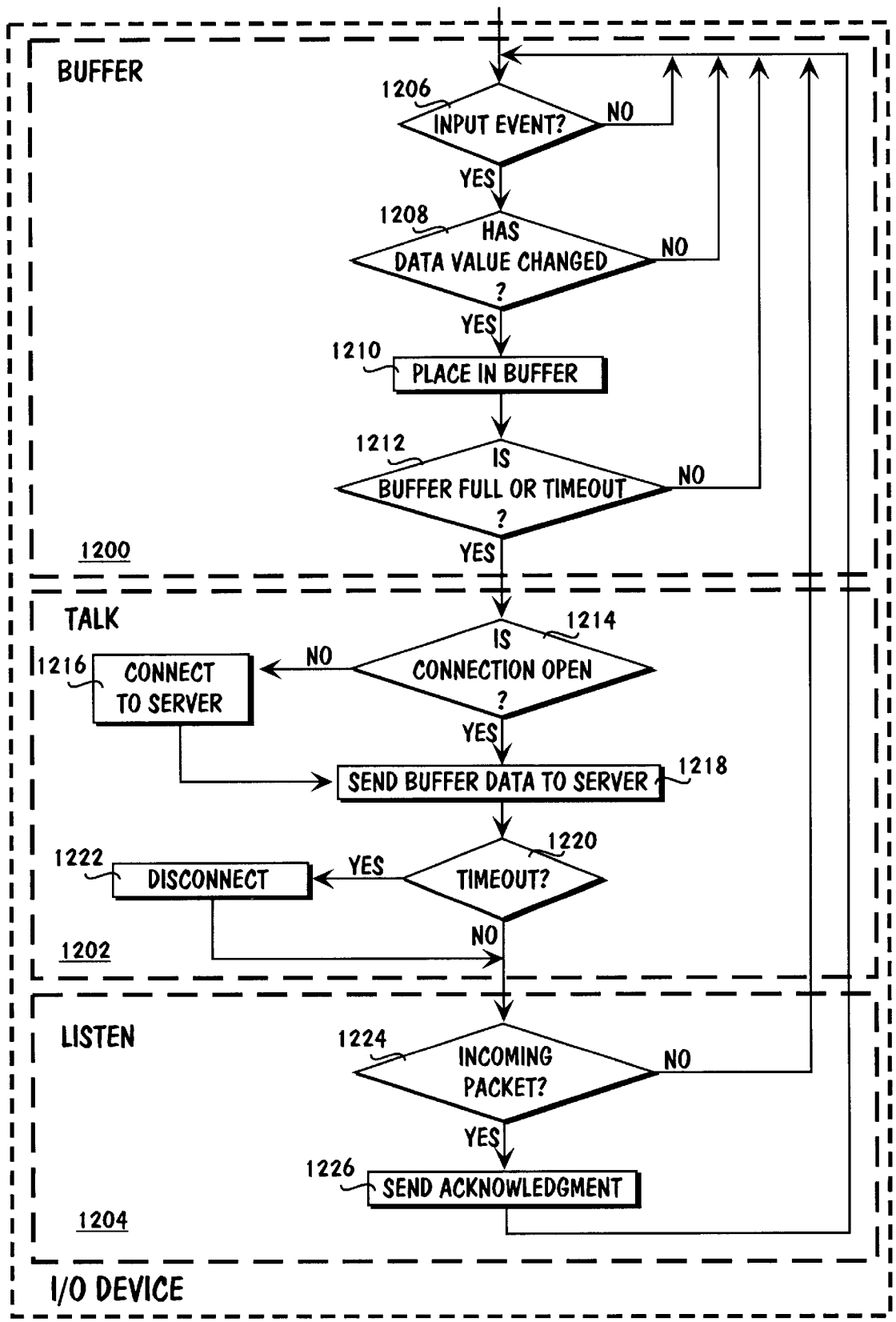
FIG. 18 is a process flow diagram showing the processes associated with a network enabled device.

FIGS. 17 and 18 are process flow-diagrams which show, respectively, the operation of the server and the call and reply portions of the network peripheral device.

In FIG. 17 the processes associated with an embodiment of the server 102 are shown. In the embodiment shown processes are split into those associated with listening 1100 to incoming packets and responding to them, with subjecting data portions of incoming packets to a database processes 1102, and with checking intermittently on the status 1104 of network peripheral devices.

The processes associated with listening for communications on the network begin with decision process 1106. When a packet is received having a destination address corresponding to the server address, control is passed to decision process 1108. In decision process 1108, a determination is made as to whether the destination port address at the transport layer of the incoming packet corresponds to an existing port. If that determination is in the affirmative, control is passed to process 1116. In process 1116 the device table 414 is read to determine the parameters of the network peripheral device sending the date. Those parameters include as discussed above the device type, the device address and device status. Control is the passed to process 1122 in which the information from the device table along with the payload are sent to the database subroutine 1104.

If alternately in decision process 1108 a determination is made that the port address of the incoming packet does not correspond to that of an existing port, then control is passed to process 1110. In process 1110 a new port is assigned for packets originating from this source address. Control is then passed to process 1112. In process 1112, the source address is read and control is passed to process 1114. In process 1114, a determination is made as to whether the port exist as an entry in the device table. If that determination is in the affirmative, then control is passed to process 1116 discussed above. In the event that determination is in the negative, control is passed to process 1118, in which a query command is sent from the server to the network device requesting information from the device as to its type. In an embodiment of the invention the device may respond with a unique identification which contains this information. Control is then passed to process 1120. In process 1120 the information obtained in response to the query is written into the device table in a record associated with this device. Control is then passed to process 1122. From Process 1122 as discussed above, control is passed to the database processes generally 1104.

The first of the database routine processes is decision process 1124. In decision process 1124 a determination is made as to whether the device ID matches that of an existing record. In the event that determination is in the negative, a new record is open, and control is passed to process 1128. If alternatively a decision is in the affirmative that there is an existing record for this device then control is also passed to process 1128. In process 1128 the data in the incoming packet is appended to or substituted for or transferred into the record. In an embodiment of the invention, the record may include pointers to files dedicated to each recording the history of each of the specific devices. Control is then passed generally to the node status block 1104 for determination of the status of the nodes.

Processing in the node status outing begins at decision process 1130 in which a determination is made as to whether the interval in which a status check must be performed has expired. In the event that determination is in the negative then control is returned to decision process 1106. Alternatively, if the decision is in the affirmative, then control is passed to decision process 1132. In decision process 1132, the device table 414 is read to determine which peripheral device is the server has received data from. Control is then passed to process 1134. In process 1134 a request is sent to each of the listed devices to determine their current status, e.g. alive or dead. Control is then passed to process 1136. In process 1136, an entry is made in the status portion of each device record in the device table 414 indicating the status of the device. (control is then returned to decision process 1106.

FIG. 18 shows the processes associated with the intelligent I/O device which are characterized generally as including a buffering routine 1200, a talk or reply routine 1202 and a listening routine 1204. Additional processes discussed above in connection with FIGS. 11 and 14 may also be implemented on the intelligent network I/O peripheral device. The buffer routine begins with decision process 1206 in which a determination is made as to whether an input event has occurred. In the event this determination is in the affirmative, control is passed to decision process 1208. An input event could correspond for example to the passage to a smart guard to a smart guard reader to a new frame from a camera. In decision process 1208, a determination is made as to the significance of the input event. This decision process is optional but has the value, particularly when applied to a constant data stream, such as that provided by a temperature sensor or a camera of discarding data representing an insignificant change from an earlier data value on the basis user defined parameters. These parameters may be downloaded by a user or a program end of the device at time of manufacture. They include for example, the ability to discard temperature variations less than a certain amount on the theory that the person to whom such information would be sent has no real need to monitor temperature with that decree of precision. If the retrieved data is deemed to have significance, then control is passed to Process 1210. In process 1210 the data is placed in the buffer 624. Control is then passed to decision process 1212. In decision process 1212, a determination is made as to whether the buffer is full or a time out has expired in which case this data need, to be transferred. If a determination is in the negative, control is returned to decision process 1206. Alternatively if the decision is in the affirmative, control is passed to the talk/reply routine 1202.

The first of the processes of the talk/reply routine is decision process 1214. In decision process 1214, a determination is made as to whether a connection to the target server(s) is open. In the event that a determination is in the negative, control is passed to the process 1216. In process 1216, a connection to the server is open. Control then passes to process 1218. If, alternatively, at decision process 1214 a determination is made that a connection is open then control passes directly to process 1218. In process 1218, the buffer data is sent to the one or more target servers. Control is then passed to decision process 1220. In decision process 1220, a determination is made as to whether a time out interval associated with the opening of the connection has expired. This time cut interval assures that open connections are minimized. If the time out has expired, then control has passed to process 1222 in which a closed connection is initiated (see FIGS. 16A–F). Control then returns to the listening routine 1204. If alternately in decision process 1220, determination is made that the time out interval has not expired, then control is passed directly to the listening routine 1204.

The first of the Processes of the listening routine is decision process 1224. In decision process 1224, a determination is made as to whether an incoming packet has been received. If that determination is in the negative control returns to decision process 1206 and the buffering routine in general. Alternatively, if the decision in the affirmative is reached in decision process 1224, then control is passed to process 1226. In process 1226, an acknowledgment is sent from the I/O device to the source of the incoming packet. Control is then returned to decision process 1206. Anyone of these sequences can be expanded to include additional functionality. As discussed above, in connection with FIG. 14, processes for downloading codes specific to peripheral device may be advantageous. In another embodiment, it may be advantageous to expand the listening routine to include other responsive capabilities such as responding to a status request, performing an internal diagnostic or evoking certain change in the parameters of the peripheral or network device. A change in parameters could include for example, a change in the size or time out associated with the buffer, a buffer in the parameters associated with determining whether a data value has experienced a significant change or an alteration in the performance parameters of the peripheral device itself. All of these implementations can be practiced parting from the central teachings of the current invention.

The foregoing description of embodiments of the present invention has been presented for purposes of illustration and description only. It is not intended to be exhaustive or to limit the invention to be forms disclosed. Many modifications and variations will be apparent to practitioners skilled in the art.

What is claimed is:

1. A method for distribution of data from a network enabling input/output device (NEIOD) to a data receiving node in a network, which includes a plurality of nodes, comprising:

transmitting an initiation message from said data receiving node to the NEIOD, transmitting a preparation message from the NEIOD to said data receiving node in response to said initiation message, and transmitting data, at least from the NEIOD to said data receiving node, over an open data channel.

2. A method according to claim 1, comprising transmitting, from the NEIOD to said one data receiving node, the latest data from a data providing means over said open data channel without awaiting a request from the data receiving node and preferably in response to the receipt, at the NEIOD, of said data.

3. A method according to claim 1, wherein said data is received at the data receiving node by a communication module.

4. A method according to claim 3, wherein said communication module is a Java applet.

5. A method according to claim 1, comprising setting up at least one open data channel between the NEIOD and at least one data receiving node.

6. A method according to claim 5, comprising setting up said open data channel, wherein a data length of an intended transmission is undefined.

7. A method according to claim 1, wherein the initiating message is a request for at least one communication module to be transmitted from the NEIOD to said data receiving node and wherein the preparation message includes a transmission of at least one communication module.

8. A method according to claim 1, comprising presenting said transmitted data on a web page in a browser executing in said data receiving node.

9. A method according to claim 8, wherein the presentation of data on the web page is controlled by a communication module in said first node, wherein the communication module is receiving the data from the NEIOD.

10. A method according to claim 1, wherein the communications between said first node and the NEIOD comprise a hypertext transfer protocol.

11. A method according to claim 1, comprising transmitting data from the NEIOD over a plurality of open channels to a plurality of data receiving nodes.

12. A method according to claim 11, wherein said data to a plurality of data receiving nodes are of the same origin.

13. A method for a network enabling input output device (NEIOD) to collect data from at least one data providing means and distribute data over a network to at least one data receiving node of a plurality of nodes comprising:
  receiving an initiation message from the data receiving node,
  transmitting a preparation message to said one data receiving node for initiating communication with said one data receiving node, in response to the initiation message, and
  transmitting data over an open data channel to said one data receiving node.

14. A method according to claim 13, comprising, in response to the receipt of said data, transmitting the latest received data from a data providing means over said open data channel to said one data receiving node.

15. A method according to claim 13, comprising:
  receiving data from at least one data providing means, and
  transforming said data from one data providing means to a format readable by said one receiving node.

16. A method according to claim 13, comprising, in response to said preparation message, setting up at least one open data channel to at least one receiving node for the transmission of data.

17. A method according to claim 16, comprising setting up said open data channel, wherein a data length of an intended transmission is not defined.

18. A method according to claim 13, comprising transmitting said data to a communication module at the data receiving node.

19. A method according to claim 18, wherein said communication module is a Java applet.

20. A method according to claim 13, wherein the initiating message is a request for at least one communication module to be transmitted from the NEIOD to said first node and the preparation message is a transmission of at least one communication module.

21. A method according to claim 13, wherein a hypertext transfer protocol is used for the communication between the NEIOD and said one receiving node.

22. A method according to claim 13, comprising receiving at least one request from a data receiving node regarding transmission of new control data to a data providing means.

23. A method for a first node of a plurality of nodes within a network to request and receive dynamic data over the network from a network enabling input/output device (NEIOD), comprising:
  transmitting an initiation message to the NEIOD,
  receiving a preparation message from the NEIOD, and
  receiving data over an open data channel from the NEIOD.

24. A method according to claim 23, comprising receiving latest data from the NEIOD over said open data channel as it becomes available.

25. A method according to claim 23, wherein said data is received by a communication module in said first node.

26. A method according to claim 25, wherein said communication module is a Java applet.

27. A method according to claim 23, comprising presenting the data on a web page in a browser executing in said first node.

28. A method according to claim 27, wherein the presentation of data on the web page is controlled by a communication module in said first node, the communication module receiving the data from the NEIOD.

29. A method according to claim 23, comprising transmitting control information to the NEIOD.

30. A method according to claim 23, wherein the communications between said first node and the NEIOD comprise a hypertext transfer protocol.

31. A method according to claim 23, wherein an initiating message is a request for at least one communication module to be transmitted from the NEIOD to said first node and a preparation message is a transmission of at least one communication module.

32. A method according to claim 23, comprising the act of requesting the NEIOD to set-up an open data channel to said first node.

33. A method for creating, from a first node of a plurality of nodes in a network, a dynamic presentation of sampled data, comprising:
  requesting an electronic page for selecting data providing means from a network enabling input output device (NEIOD) in a second node,
  presenting the electronic page for selecting data providing means on a screen at said first node,
  transmitting a selection message, comprising indications of at least one selected data providing means, to the NEIOD,
  receiving an electronic page, comprising at least one representation of at least one data providing means, from the NEIOD, and
  connecting to the NEIOD for requesting and receiving dynamic data over the network.

34. A method according to claim 33, comprising:
  receiving an electronic page, requested by the selection message, from the NEIOD, the electronic page comprising selectable configurations of the at least one selected data providing means, and transmitting a configuration message to the NEIOD, the configuration message comprising indications of selected configurations of the at least one selected data providing means.

35. A method according to claim 33, comprising the acts of:

receiving an electronic editing page from the NEIOD, the electronic editing page comprising at least one representation of at least one data providing means, wherein an altering of a position of a representation of a data providing means, within the electronic page, is possible, and transmitting, a layout message to the NEIOD, the layout message comprising a position of at least one data providing means.

36. A method according to claim 33, wherein said electronic pages are web pages presented by a browser executing in the first node.

37. A method according to claim 33, wherein said at least one representation of at least one data providing means is a Java applet.

38. A network enabling input output device (NEIOD) for collecting data from data providing means and for providing data to at least one data receiving node of a plurality of nodes in a network, comprising:

input means for receiving data from data providing means, means for setting up an open data channel, over the network, to said one data receiving node, and means for transmitting data, independently of said receiving node, whenever data is ready for transmission.

39. A network enabling input output device according to claim 38, further comprising at least one communication module to be sent to said one data receiving node.

40. A network enabling input output device according to claim 38, further comprising:

input means for receiving control data from a communication module executing in said one data receiving node, and output means for controlling at least one I/O device.

* * * * *